(12) United States Patent  
Buragohain

(10) Patent No.: US 12,541,836 B2
(45) Date of Patent: *Feb. 3, 2026

(54) OPTICAL INSPECTION SYSTEMS AND METHODS FOR MOVING OBJECTS

(71) Applicant: BORDE, INC., San Ramon, CA (US)

(72) Inventor: Saumitra Buragohain, San Ramon, CA (US)

(73) Assignee: Borde, Inc., San Ramon, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 17/934,957

(22) Filed: Sep. 23, 2022

(65) Prior Publication Data

US 2023/0080491 A1 Mar. 16, 2023

Related U.S. Application Data

(63) Continuation-in-part of application No. 17/682,756, filed on Feb. 28, 2022, now Pat. No. 11,480,529.

(Continued)

(51) Int. Cl.
*G06V 10/12* (2022.01)
*G06T 7/00* (2017.01)
(Continued)

(52) U.S. Cl.
CPC ............ *G06T 7/0004* (2013.01); *G06V 10/12* (2022.01); *G06V 10/225* (2022.01);
(Continued)

(58) Field of Classification Search
CPC ........ G01N 21/8851; G01N 2021/8854; G06T 7/001; G06T 2207/20081; G06T 2207/30108

(Continued)

(56) References Cited

U.S. PATENT DOCUMENTS 9,785,851 B1 10/2017 Torek et al.
10,021,369 B2 7/2018 Peeters et al.
(Continued)

FOREIGN PATENT DOCUMENTS

CA 3118799 A1 5/2020
WO 2014013421 A1 1/2014
WO 2018078613 A1 5/2018

OTHER PUBLICATIONS

International Search Report mailed Oct. 13, 2022 re PCT/US2022/043105 (2 pages).

(Continued)

*Primary Examiner* — Sheela C Chawan
(74) *Attorney, Agent, or Firm* — Aurora Consulting LLC; David Jackrel; Ashley Sloat

(57) ABSTRACT

The present disclosure provides techniques for optical inspection systems and methods for moving objects. In some embodiments, an optical inspection system includes: an image capturing device configured to acquire images from moving objects; a first-stage storage system; a second-stage processor; a second-stage storage system; a third-stage processor; and a third-stage storage system. In some embodiments, an optical inspection system, includes: an image capturing device; a volatile memory system; a first and a second second-stage processor; and a third-stage storage system. The second-stage processor or the first second-stage processor can be configured to analyze the images from the image capturing device. The third-stage processor or the second second-stage processor can be configured to process information from a processor and/or storage system and produce a report.

27 Claims, 7 Drawing Sheets

Related U.S. Application Data

(60) Provisional application No. 63/243,371, filed on Sep. 13, 2021.

(51) Int. Cl.
   *G06V 10/22* (2022.01)
   *G06V 10/764* (2022.01)
   *G06V 10/774* (2022.01)
   *G06V 10/778* (2022.01)
   *G06V 10/94* (2022.01)

(52) U.S. Cl.
   CPC .......... *G06V 10/764* (2022.01); *G06V 10/774* (2022.01); *G06V 10/778* (2022.01); *G06V 10/955* (2022.01); *G06T 2207/20081* (2013.01); *G06T 2207/30128* (2013.01); *G06V 2201/06* (2022.01)

(58) Field of Classification Search
   USPC .................................................. 382/100, 128
   See application file for complete search history.

(56) References Cited

U.S. PATENT DOCUMENTS

| | | | |
|---|---|---|---|
| 10,021,370 B2 | 7/2018 | Peeters et al. | |
| 10,257,496 B2 | 4/2019 | Peeters et al. | |
| 10,298,909 B2 | 5/2019 | Peeters et al. | |
| 10,334,228 B2 | 6/2019 | Peeters et al. | |
| 10,511,827 B2 | 12/2019 | Peeters et al. | |
| 10,778,961 B2 | 9/2020 | Peeters et al. | |
| 11,480,529 B1* | 10/2022 | Buragohain | G06T 7/0004 |
| 2006/0199287 A1 | 9/2006 | Fu et al. | |
| 2011/0112684 A1 | 5/2011 | Pellenc | |
| 2013/0028487 A1 | 1/2013 | Stager et al. | |
| 2017/0054950 A1 | 2/2017 | Yeo et al. | |
| 2018/0077402 A1* | 3/2018 | Peeters | H04N 13/243 |
| 2018/0324407 A1 | 11/2018 | Peeters et al. | |
| 2020/0167905 A1* | 5/2020 | Bian | G01N 21/91 |
| 2020/0260064 A1 | 8/2020 | Peeters et al. | |
| 2020/0260065 A1 | 8/2020 | Peeters et al. | |
| 2020/0294248 A1 | 9/2020 | Garrett et al. | |
| 2021/0120223 A1 | 4/2021 | Peeters et al. | |
| 2021/0266145 A1* | 8/2021 | Chen | G06F 9/4881 |

OTHER PUBLICATIONS

Written Opinion mailed Oct. 13, 2022 re PCT/US2022/043105 (4 pages).
International Preliminary Report on Patentability re International Application No. PCT/US2022/043105 dated Mar. 5, 2024 (5 pages).
"Free-fall nut inspection with Borde," BordeAI, published Oct. 17, 2022. https://www.youtube.com/watch?v=6zGjiWLHMAE.
Extended European Search Report re 22868134.2-1218/4402461 PCT/US2022043105 dated Jun. 18, 2025 (7 pages).

* cited by examiner

OPTICAL INSPECTION SYSTEMS AND METHODS FOR MOVING OBJECTS

RELATED APPLICATIONS

This application claims the benefit of U.S. Provisional Patent Application No. 63/243,371, filed on Sep. 13, 2021, and entitled "Optical Inspection Systems and Methods for Moving Objects"; and U.S. Non-Provisional patent application Ser. No. 17/682,756, filed on Feb. 28, 2022, and entitled "Optical Inspection Systems and Methods for Moving Objects"; which are which is hereby incorporated by reference for all purposes.

BACKGROUND

Optical inspection systems can use one or more cameras to acquire, process and analyze images of objects to extract data from the objects in order to produce numerical or symbolic information. Optical inspection systems can be used in various applications including quality control (QC) or quality assurance (QA) to support a production (or manufacturing) process, and inspection and sorting of objects for recycling. In some cases, optical inspection systems can use artificial intelligence, computer vision, and/or machine learning to analyze the acquired images.

SUMMARY

The present disclosure provides techniques for optical inspection systems and methods for moving objects. In some embodiments, an optical inspection system, includes: a first image capturing device configured to acquire images of an object that is moving; a first first-stage storage system coupled to the first image capturing device and configured to store images from the first image capturing device; a first second-stage processor coupled to the first first-stage storage system and configured to analyze the images from the first image capturing device; a second image capturing device configured to acquire images from the object that is moving; a second first-stage storage system coupled to the second image capturing device and configured to store images from the second image capturing device; a second second-stage processor coupled to the second first-stage storage system and configured to analyze the images from the second image capturing device; a second-stage storage system coupled to the first and second second-stage processor and configured to store images and information from the first and second second-stage processors; a third-stage processor coupled to the second-stage storage system and configured to process information from the second-stage processor and second-stage storage system and produce a report; and a third-stage storage system coupled to the third-stage processor and configured to store images and information from the third-stage processor.

In some embodiments, an optical inspection system, includes: a first image capturing device configured to acquire images of an object that is moving; a first volatile memory system coupled to the first image capturing device and configured to store images from the first image capturing device; a first second-stage processor coupled to the first volatile memory system and configured to analyze the images from the first image capturing device; a second image capturing device configured to acquire images from the object that is moving; a second volatile memory system coupled to the second image capturing device and configured to store images from the second image capturing device; a second second-stage processor coupled to the second volatile memory system and configured to analyze the images from the second image capturing device; a third second-stage processor coupled to the first and second second-stage processors and configured to process information from the first and second second-stage processors; and a third-stage storage system coupled to the third second-stage processor and configured to store images and information from the third second-stage processor, wherein the third second-stage processor is configured to produce a report using the images and information stored in the third-stage storage system.

In some embodiments, an optical inspection system includes: an image capturing device configured to acquire images of an object that is moving; a first-stage storage system coupled to the image capturing device and configured to store images from the image capturing device; a second-stage processor coupled to the first-stage storage system and configured to analyze the images from the image capturing device; a second-stage storage system coupled to the second-stage processor and configured to store images and information from the second-stage processor; a third-stage processor coupled to the second-stage storage system and configured to process information from the second-stage processor and second-stage storage system and produce a report; and a third-stage storage system coupled to the third-stage processor and configured to store images and information from the third-stage processor.

In some embodiments, an optical inspection system includes: an image capturing device configured to acquire images of an object that is moving; a volatile memory system coupled to the image capturing device and configured to store images from the image capturing device; a first second-stage processor coupled to the volatile memory system and configured to analyze the images from the image capturing device; a second second-stage processor coupled to the first second-stage processor and configured to process information from the first second-stage processor; and a third-stage storage system coupled to the second second-stage processor and configured to store images and information from the second second-stage processor. The second second-stage processor can be configured to produce a report using the images and information stored in the third-stage storage system.

DETAILED DESCRIPTION

Figure 1:
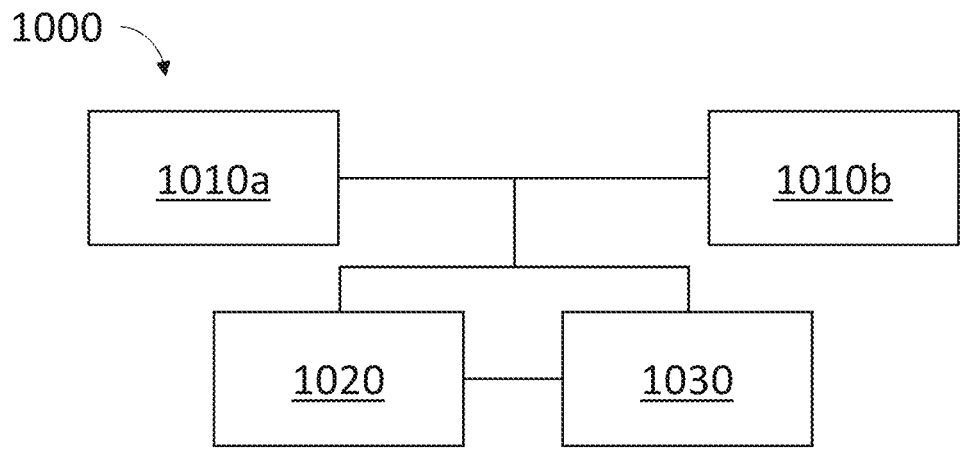
FIG. 1 shows an example of an optical inspection system, in accordance with some embodiments.

Optical inspection systems and methods for inspection of moving objects, free falling objects, and/or fast-moving objects ("fast-moving object") are described herein.

"Fast-moving objects" can move faster than about 1 m/s, or from about 1 m/s to about 10 m/s, or from about 2 m/s to about 6 m/s or from about 0.1 m/s to about 10 m/s. The optical inspection systems described herein enable inspection of a high number of objects (e.g., fast-moving objects) per time interval. For example, the optical inspection systems described herein enable inspection of an object in less than about 18 ms to about 20 ms, or about 10 objects in less than about 18 ms to about 20 ms, or up to about 100 objects in less than a time period from about 18 ms to about 20 ms, or up to about 40,000 lbs of objects per about one hour, or about 20 metric tons of objects per about one hour, or about 5000 objects per about one second. The optical inspection systems described herein can be applied in a variety of applications including, but not limited to, identifying and/or sorting of food (e.g., nuts), waste and/or recyclable objects, mining and minerals, and pharmaceutical and nutraceutical products. In some cases, the optical inspection systems can also perform sorting of objects, for example, by using a mechanism (e.g., an ejector or a robotic arm) to route objects to different locations based on the results (e.g., classification, or grades) output from a component of the optical inspection system.

The optical inspection systems and methods described herein can acquire images of (fast-moving) objects, optionally pre-process the images, analyze the images to determine a classification, categorize and/or grade the objects, save the images and/or information generated from the analysis, and optionally generate reports based on the information generated from the analysis. Some examples of classifications (or classes, or categories, or grades) that the optical inspection systems and methods described herein can use are those related to quality (e.g., defective, non-defective), category (e.g., type-A, type-B), size (e.g., small, large), shape (e.g., round, square), color (e.g., white, black, uniform, non-uniform), or any other visual characteristic of the objects.

In some cases, the optical inspection systems and methods described herein acquire images using digital cameras. In some cases, acquired images are stored using a hybrid in-memory and solid-state drive (SSD) storage system that enables the present systems to perform high-speed image acquisition and analysis. In some cases, the analysis is performed using artificial intelligence (AI) (e.g., AI-based object detection). Recording and/or writing reports for grading may also be done by the optical inspection systems and methods described herein, based on the analysis and/or grading performed. The analysis and/or grading may include adding bounding boxes around each object in an image, and determining a classification and/or grade for each object in an image or set of images.

In some cases, the optical inspection systems and methods described herein include offloading images (and optionally image data) to be written to memory (a storage system), and to a graphics processing unit (GPU), a central processing unit (CPU) and/or a field-programmable gate array (FPGA) for processing (e.g., the analysis and/or grading). Such systems can be fast enough to keep up with real-time object analysis (e.g., classifying and/or grading an object in under about 18 ms, or under about 20 ms).

In some cases, the optical inspection systems and methods described herein include 3D grading of both sides of fast-moving object(s).

In some cases, the optical inspection systems and methods described herein include automated start and stop of AI generation (or image capture, or analysis, or image processing). For example, a trigger can be provided to start and/or stop AI generation (or image capture, or analysis, or image processing).

In some cases, the AI object detection is always on, and does not use an external trigger or sensor. A "polling period" is a time period between instances of capturing images and/or analyzing the captured images. For example, the system (using AI processing) can inspect (fast-moving) objects in images captured from one or more cameras frequently, e.g., with a fast "polling period" (e.g., about 20 ms). If an object is not detected in a captured image for a time period (e.g., a "slowdown window," e.g., about 1 min), then the "polling period" can be increased (e.g., doubled or quadrupled, or from about 20 ms to about 40 ms). This process can continue until a pre-set maximum "polling period" (e.g., about 1000 ms) is reached, and then the system can continue polling every about 1000 ms (or 1 second). If a single (fast-moving) object is detected in the "polling period," the system, can then automatically accelerate to the standard "polling period" (e.g., of about 20 ms) so that the system can resume capturing and/or analyzing images of the (fast-moving) objects. In some cases, AI report generation can be paused after the "polling period" reaches a pre-set maximum threshold (e.g., about 100 ms, or about 500 ms, or about 1000 ms), and then once a (fast-moving) object is detected, the AI can resume capturing and/or analyzing images, and the AI report generation can also resume.

In some cases, the AI object detection of the optical inspection systems and methods described herein also uses information (a signal, or trigger) from an external sensor to determine when to capture images, analyze images, and/or generate AI reports. For example, motion sensors and/or photo-electric sensors can be used together with the above method in a complementary manner where input from a sensor as well as object detection from the AI engine are used to refine the "polling period," when to capture and/or analyze images, and/or generate AI reports.

The optical inspection systems and methods described herein can be used in logical inspection lines including 2 or more (e.g., from 2 to 10, or 6) image capture devices, processors and/or storage devices (e.g., with components connected in parallel within a single device). In such systems with multiple inspection lines, each line can have its own reporting and grading with its own camera(s), light(s), and/or mounting kit, that are all connected to a single device where the information (e.g., captured images, processed images, and/or information about the images) can be logically grouped and/or analyzed. For example, each logical inspection line can handle its own image capture (acquisition) and processing with 2 or more logical inspection lines sharing a processor (e.g., a FPGA, a CPU, and/or a GPU), and a storage system (e.g., DRAM and/or SSD). Such systems can be advantageous because they can reduce the total cost of the system, and can enable the inspection of more objects per a given interval of time. For example, in a process where multiple lines of objects converge into one line with a larger number of objects per unit time, multiple inspection lines (e.g., each having its own reporting and grading with its own camera(s), light(s), and/or mounting kit) placed on the multiple lines of objects (before converging) can enable all of the objects to be inspected, which may not be possible if one optical inspection system were installed on the converged line with a larger number of objects passing the system per unit time.

The optical inspection systems and methods described herein can be configured to inspect (fast-moving) objects in free fall (e.g., falling off a discharge chute) or to inspect objects on a horizontal conveyor belt. For example, the cameras can be positioned (e.g., facing approximately horizontally) to capture images of objects during free fall, or can be positioned (e.g., facing approximately downwards) to capture images of objects moving on a conveyor belt. In the case where there are multiple free fall lines (or streams) of objects, there can be a logical inspection line for each of the multiple free fall lines of objects, each sharing a processor and/or storage system as described above. Similarly, in the case where there are multiple lines (or streams) of objects moving on multiple conveyor belts, there can be a logical inspection line for each of the multiple lines of objects, each sharing a processor and/or storage system as described above.

In some cases, the AI model comprises deep learning models. In some cases, the AI models include one or more of a family of object detection and tracking architectures and models that are pretrained on the common objects in context (COCO) dataset. In some cases, the AI model comprises deep learning object detection models such as Fast Region-based Convolutional Neural Network (Fast R-CNN) or Faster R-CNN, or regression-based object detectors such as a Single Shot Detector or You only Look Once (YOLO).

The image capturing devices of the systems and methods described herein can be any devices capable of capturing a digital image, including digital cameras, charge-coupled device (CCD) cameras, and digital video recording devices (i.e., digital video cameras). In some cases, the image capturing device(s) are video recording devices that capture video, and still images are extracted from the captured video. For example, a video captured using a digital video camera can be stored as a video file in a storage system (e.g., DRAM, persistent memory, and/or SSD) or in volatile memory (e.g., DRAM, and/or SRAM). Still images can then be extracted from the stored video file using a processor (e.g., a GPU, a CPU, or an FPGA). In some cases, the image capturing device(s) are digital video camera(s) that are used in a mode where the video cameras capture still images and then output the still images to another component of the system such as a storage device (e.g., DRAM, persistent memory, and/or SSD) or volatile memory (e.g., DRAM, and/or SRAM). The embodiments described above, wherein the image capturing devices are video cameras, may apply to any of the embodiments described elsewhere herein, for example at least those embodiments described in FIGS. 1-5.

Components of the systems described herein can be located either at the physical location of the objects being inspected, or they can be located in the cloud. Components that are located in the cloud are located at a physical location that is remote (or different than) the physical location of the objects being inspected. For example, a storage system or processor of the systems described herein that is located in the cloud can be located at a datacenter or other physical location away from the location of the objects being inspected. In the systems and methods described herein, components located in the cloud can be used to store or process information in the cloud. In some cases, data can be stored in the cloud using a cloud storage system (e.g., a cloud storage system from Microsoft, or Amazon Web Services).

In general, components that directly interact with the objects being inspected (e.g., the image capturing device(s), optionally trigger sensors, and optionally ejectors) are located at a facility where objects are inspected, and all of the other components of the system (e.g., the storage systems, volatile memory, and/or the processors) can be located either at the location of the objects being inspected (e.g., at a plant or facility) or in the cloud. In some cases, some of the storage systems, volatile memory, and/or the processors of the system can be located at the facility and some can be located in the cloud. In other cases, all of the storage systems, volatile memory (if the system uses volatile memory), and the processors of the system can all be located in the cloud.

For example, an image capturing device can transmit captured images (e.g., using a high-speed data transfer method, such as 5G) to storage systems and/or processors located in the cloud for storage, processing and/or report generation. In some cases, captured images, pre-processed images, and/or other data (e.g., bounding box location, and/or grades) can be stored in storage systems located in the cloud. In some cases, the analysis, categorization, and/or classification of the captured images (or an object in the captured images) can be performed by processors that are located in the cloud. In some cases, the images are captured at the location where the objects are inspected, then data (e.g., captured images, pre-processed images, and/or other data such as bounding box location and/or grades) can be stored in storage systems located in the cloud and/or processed by processors in the cloud, and then data can be sent from components in the cloud back to components at the location where the objects are inspected for further storage, processing and/or report generation.

FIG. 1 shows an example of an optical inspection system 1000 for quality inspection of objects (e.g., fast-moving objects) including a first image capturing device (or first set of image capturing devices) 1010*a* and a second image capturing device (or second set of image capturing devices) 1010*b*, a storage system 1020, and a processor 1030. Images of objects (e.g., fast-moving objects) are taken by the (sets of) image capturing devices 1010*a* and 1010*b* (e.g., a digital camera or CCD camera). Image capturing devices 1010*a* and 1010*b* can be any devices capable of capturing a digital image, including digital cameras, charge-coupled device (CCD) cameras, and digital video recording devices (i.e., digital video cameras). The images are then either sent to storage system 1020 (e.g., containing a DRAM, persistent memory, and/or an SSD) to be saved, or to processor 1030 (e.g., a GPU, a CPU, and/or an FPGA) to be processed. The storage system 1020 and processor 1030 can be used to analyze the images, save the images, grade the images, save the gradings and graded images, and/or produce reports of the analysis. Storage system 1020 and/or processor 1030 can be located in either the physical location of the objects being inspected, or they can be located in the cloud (e.g., at a datacenter, or other physical location).

For example, in some cases, images from (sets of) image capturing devices 1010*a* and 1010*b* are sent to processor 1030 (or another processor, not shown) to perform pre-processing of the images. The pre-processing can include cropping the images and/or size-reducing the images. In some cases, after pre-processing, the pre-processed images are stored in storage system 1020. In some cases, after storage, processor 1030 further analyzes the stored pre-processed images (and optionally determines a grade of an object based on the stored pre-processed images), and the further analyzed images (and optionally object grade or quality information) is stored in storage system 1020. The processor 1030 can use AI to analyze the images, where the analysis can include adding bounding boxes surrounding the objects in the images, classifying the objects in the images, and/or grading the objects in the images.

In some cases, uncompressed, high-resolution data is captured from the image capturing device(s). Then, to save storage space and processing time, the size of the captured image can be reduced (e.g., using approaches such as letterbox, or reducing a 2448×784 pixel image to a 640×224 pixel image without compressing (e.g., to a jpeg format)) and the size-reduced image is then stored to a persistent storage system. This approach can help avoid time consuming image compression (e.g., to jpeg) as well as reducing the amount of expensive memory required. In some cases, the AI engine can analyze full uncompressed (e.g., 2448×784 pixel) images. However, in some cases, doing so can increase the AI processing time, and slow down the processing speed of the system. Therefore, in some cases, to improve the performance of the system, size-reduced (e.g., 640×224 pixel) images are retrieved from the storage system and analyzed using the AI processing engine. In some cases, after the size-reduced images are analyzed using the AI engine and a list of objects detected with corresponding bounding boxes is produced, the image(s) are then compressed and stored in a post-processing stage. In the post-processing stage, the images and/or data can be converted into a tabular report format (e.g., including metadata), which allows the image with the analysis (e.g., a grading report) to be viewed (e.g., by an operator).

In another example, in some cases, images from (sets of) image capturing devices 1010a and 1010b are sent to processor 1030 to perform pre-processing of the images, then the processor 1030 analyzes the pre-processed images (and optionally determines a grade of an object based on the stored pre-processed images), and the analyzed images (and optionally object grade or quality information) are stored in storage system 1020.

In some cases, one or more reports can be generated from the stored information in storage system 1020.

Figure 2:
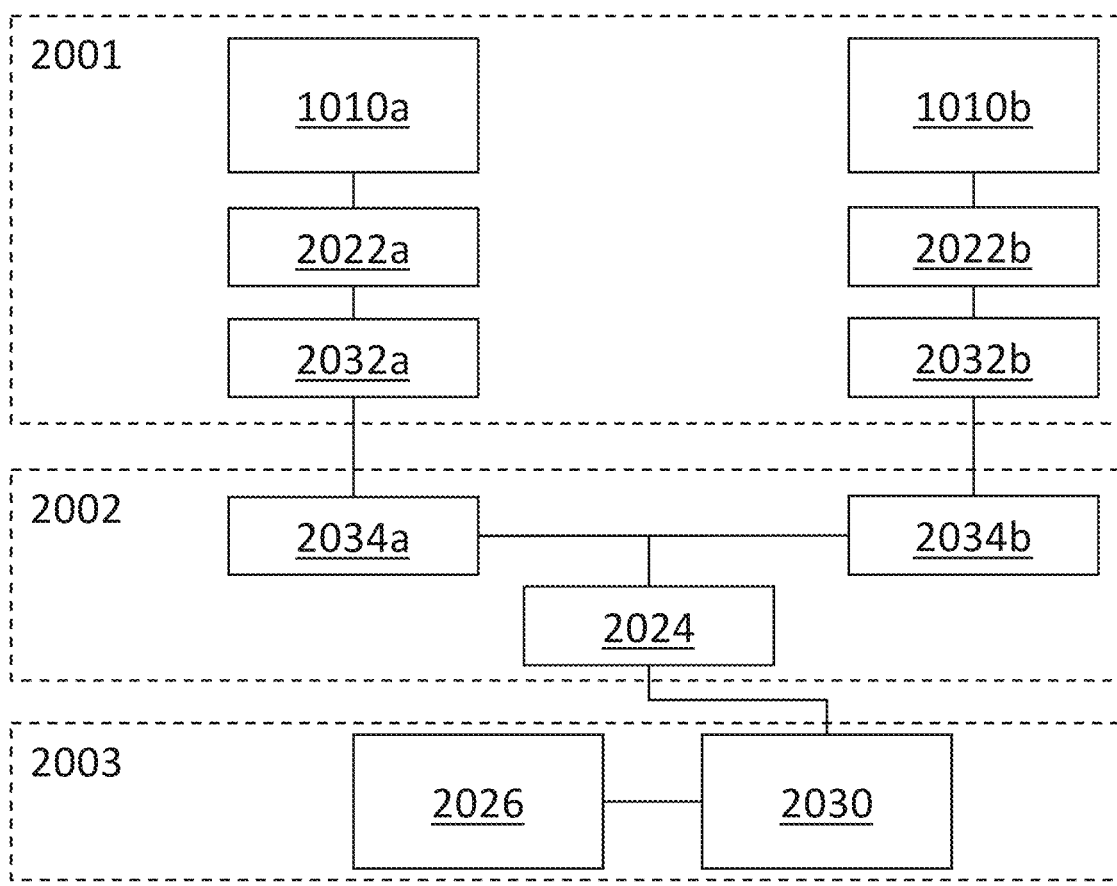
FIG. 2 shows an example of an optical inspection system, in accordance with some embodiments.
Figure 3:
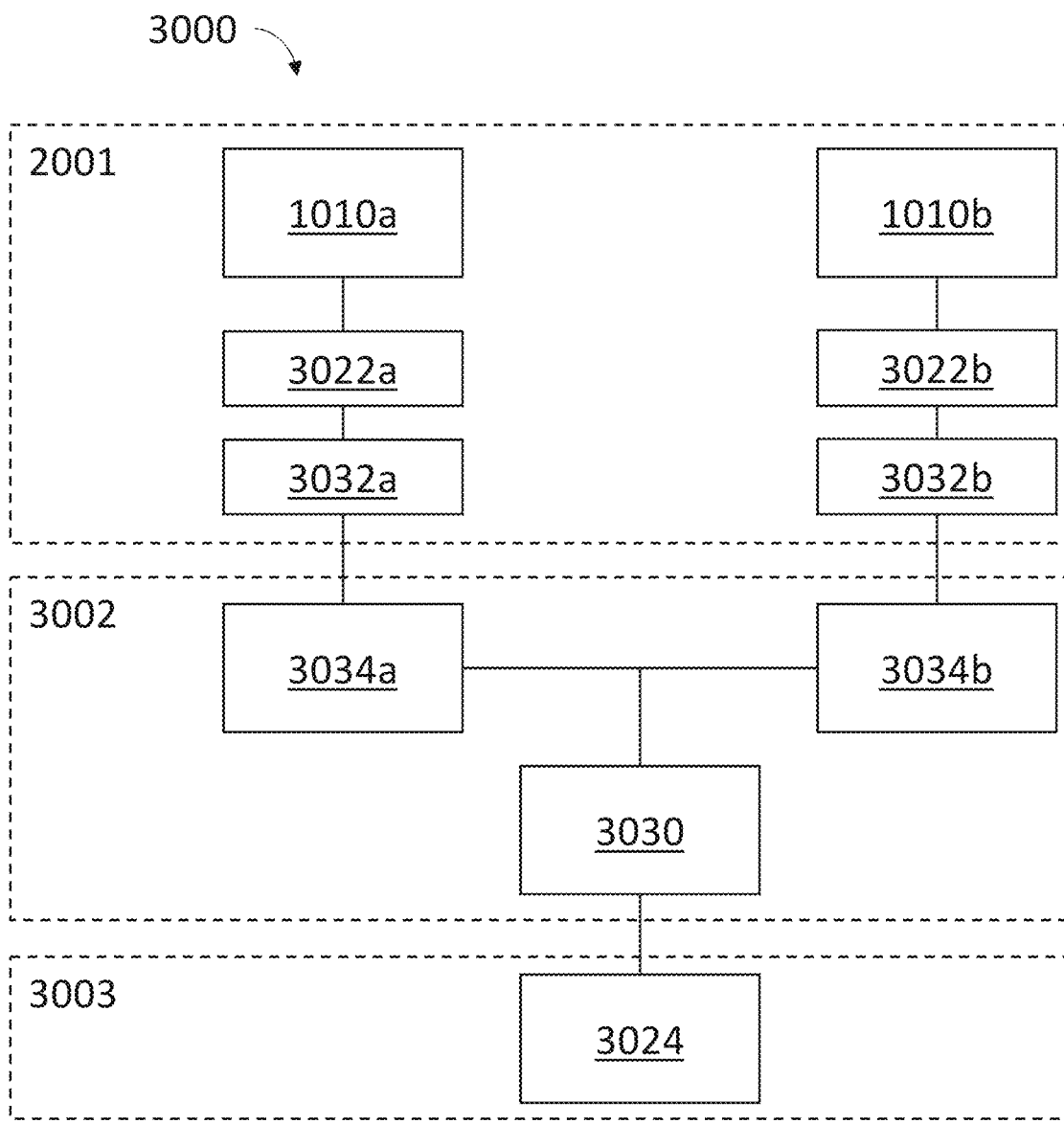
FIG. 3 shows an example of an optical inspection system, in accordance with some embodiments.

FIGS. 2 and 3 show examples of optical inspection systems 2000 and 3000 for quality inspection of objects (e.g., fast-moving objects). Some of the components in system 1000 in FIG. 1 are the same as or similar to those in the systems 2000 and 3000 in FIGS. 2 and 3.

FIG. 2 shows an example of an optical inspection system 2000 for quality inspection of objects (e.g., fast-moving objects) with a first stage 2001, a second stage 2002 and a third stage 2003. The optical inspection system 2000 includes a first image capturing device (or first set of image capturing devices) 1010a and a second image capturing device (or second set of image capturing devices) 1010b (as shown in FIG. 1), two first-stage storage systems (or devices) 2022a and 2022b (e.g., DRAM, persistent memory, and/or SSD), two first-stage processors 2032a and 2032b (e.g., CPUs, cores of a CPU, or FPGAs), two second-stage processors 2034a and 2034b (e.g., GPUs and/or FPGAs), a second-stage storage system 2024 (e.g., DRAM, persistent memory, SSD, and/or a write-optimized pseudo-database), a third-stage processor 2030 (e.g., a CPU or FPGA), and a third-stage storage system 2026 (e.g., DRAM, persistent memory, SSD, and/or a relational database).

In the first stage of optical inspection system 2000, and of a corresponding method of using system 2000, images are captured by the image capturing devices 1010a and 1010b, and stored in the first-stage storage system 2022a and 2022b. In the first stage 2001, the images are pre-processed (e.g., cropped, size-reduced) using the first-stage processors 2032a and 2032b. In the second stage, the second-stage processors 2034a and 2034b analyze the pre-processed images to produce information about the images (e.g., bounding box sizes and locations, object classifications, and/or object grades). The images and/or information from the second-stage processors 2034a and 2034b are then saved using the second-stage storage system 2024. In a third stage 2003, the saved images and information (generated from the analysis) are then further processed using the third-stage processor 2030, for example, to convert the data to a tabular format, to produce a report (e.g., with information about the images, bounding boxes, and object categories or grades), and/or to save the tabular data to a database. The information from the third-stage processor 2030 can then be saved to the third-stage storage system 2024. In some cases, the images may be graded (e.g., given a U.S. Department of Agriculture (USDA) grading) and/or a report may be generated using a processor (e.g., third-stage processor 2030, or a fourth-stage processor in an optional fourth stage (not shown)).

The processors 2032a-b, 2034a-b, and/or 2030 in FIG. 2 can be separate CPUs, separate FPGAs, or separate cores of one or more shared CPUs. In some cases, the first-stage processors 2032a and 2032b are each cores of a CPU, and one or more other cores of the CPU are also used by one or more other processors in the system. For example, processor 2032a, 2032b, and 2030 can all include cores of the same shared CPU. In some cases, processor 2030 is a CPU with some cores that perform actions in the third-stage and other cores that perform actions in the fourth-stage. Using a single CPU with multiple cores (or more than one CPU with multiple cores), where different cores (or groups of cores) are dedicated to different stages, can improve the speed of the system (e.g., the speed by which an image is acquired, pre-processed, analyzed, stored, graded and/or reported) by allowing actions from different stages to occur in parallel. For example, if a first data set (or report) is being processed in the fourth-stage, a second data set (or report) can be processed in the third-stage in parallel, rather than the processing of the first data set in the fourth-stage blocking the second data set from being processed in the third-stage. In some cases, the processors 2032a-b, 2034a-b, and/or 2030 can be FPGAs. In some cases, a fourth-stage processor (not shown) is an FPGA that is a separate FPGA from the third-stage processor (which can also be an FPGA).

All of the components of system 2000, except for the image capturing devices 1010a and 1010b, can be located at the physical location of the objects being inspected, or they can be located in the cloud (e.g., at a datacenter, or other physical location). For example, image capturing devices 1010a and 1010b can transmit captured images (e.g., using a high-speed data transfer method, such as 5G) to first-stage storage system 2022a and 2022b located in the cloud (e.g., at a datacenter, or other physical location). In another example, first-stage processors 2032a and 2032b can be located at the physical location of the objects being inspected, and they can transmit the pre-processed images (e.g., using a high-speed data transfer method, such as 5G) to second-stage processors 2034a and 2034b that are located in the cloud. In some cases, captured images, pre-processed images, and/or other data (e.g., bounding box location, and/or grades) can be stored in storage systems (e.g., first-stage storage systems 2022a and 2022b, second-stage storage system 2024, and/or third-stage storage system 2026) located in the cloud. In some cases, the analysis, categorization, and/or classification of the captured images (or an object in the captured images) can be performed by second-stage and/or third-stage processors (2034a, 2034b and/or 2040) located in the cloud. In another example, the second-stage processors 2034a and 2034b and second-stage storage system 2024 are located in the cloud, and the third-stage processor 2030 and third-stage storage system 2026 are located at the location of the objects being inspected. In such cases, captured images, pre-processed images, and/or other data (e.g., bounding box location, and/or grades) can be sent to the cloud for processing and storage, and then data can be sent back to the location of the objects being inspected for further processing and storage.

FIG. 3 shows an example of an optical inspection system 3000 for quality inspection of objects (e.g., fast-moving objects) including a first image capturing device (or first set of image capturing devices) 1010a and a second image capturing device (or second set of image capturing devices) 1010b (as shown in FIG. 1), two first-stage volatile memory systems (or devices) 3022a and 3022b (e.g., DRAM, and/or SRAM), two first-stage processors 3032a and 3032b (e.g., CPUs, cores of a CPU, or FPGAs), two second-stage processors (e.g., GPUs and/or FPGAs) 3034a and 3034b, an additional second-stage processor 3030 (e.g., a CPU or FPGA), and a storage system 3024 (e.g., DRAM, persistent memory, SSD, and/or a regional database).

In a first stage 3001 of system 3000, and of a corresponding method of using system 3000, images are captured by the image capturing devices 1010a and 1010b, and the acquired images are stored in the two first-stage volatile memory systems (or devices) 3022a and 3022b. In the first stage 3001, the images are pre-processed (e.g., cropped, size-reduced) using first-stage processors 3032a and 3032b. In the second stage 3002, the images are analyzed (e.g., bounding boxes added, and objects classified and/or graded) using second-stage processors 3034a and 3034b. The processed images and information (generated from the analysis) from the second-stage processors 3034a and 3034b are then further processed using an additional second-stage processor 3030. In a third stage, the further processed images (and information about the images, e.g., a grade) are saved using a third-stage storage system 2024. In some cases, the images may be graded (e.g., given a U.S. Department of Agriculture (USDA) grading) and/or a report may be generated using a processor (e.g., second-stage processor 3030, or a fourth-stage processor (not shown)) in an optional fourth stage.

The processors 3032a-b, 3034a-b, and/or 3030 in FIG. 3 can be separate CPUs, separate FPGAs, or separate cores of one or more shared CPUs. In some cases, the first-stage processors 3032a and 3032b are each cores of a CPU, and one or more other cores of the CPU are also used by one or more other processors in the system. For example, processor 3032a, 3032b, and 3030 can all include cores of the same shared CPU. In some cases, processor 3030 is a CPU with some cores that perform actions in the third-stage and other cores that perform actions in the fourth-stage. Using a single CPU with multiple cores (or more than one CPU with multiple cores), where different cores (or groups of cores) are dedicated to different stages can improve the speed of the system (e.g., the speed by which an image is acquired, pre-processed, analyzed, stored, graded and/or reported) by allowing actions from different stages to occur in parallel. For example, if a first data set (or report) is being processed in the fourth-stage, a second data set (or report) can be processed in the third-stage in parallel, rather than the processing of the first data set in the fourth-stage blocking the second data set from being processed in the third-stage. In some cases, the processors 3032a-b, 3034a-b, and/or 3030 can be FPGAs. In some cases, a fourth-stage processor (not shown) is an FPGA that is a separate FPGA from the third-stage processor (which can also be an FPGA).

All of the components of system 3000, except for the image capturing devices 1010a and 1010b, can be located in the physical location of the objects being inspected, or they can be located in the cloud (e.g., at a datacenter, or other physical location). For example, first-stage processors 3032a and 3032b can be located at the physical location of the objects being inspected, and they can transmit the pre-processed images (e.g., using a high-speed data transfer method, such as 5G) to second-stage processors 3034a, 3034b and 3030 that are located in the cloud. In some cases, captured images, pre-processed images, and/or other data (e.g., bounding box location, and/or grades) can be stored in third-stage storage system 3024 located in the cloud. In some cases, the analysis, categorization and/or classification of the captured images (or an object in the captured images) can be performed by second-stage processors 3034a, 3034b and 3030 located in the cloud. In another example, second-stage processors 3034a, 3034b and 3030 and are located in the cloud, and third-stage storage system 3024 is located at the location of the objects being inspected. In such cases, captured images, pre-processed images, and/or other data (e.g., bounding box location, and/or grades) can be sent to the cloud for processing, and then data can be sent back to the location of the objects being inspected for storage.

In FIGS. 1-3, the first image capturing device 1010a may be a single image capturing device, or a set of image capturing devices, and the second image capturing device 1010b may be a single image capturing device, or a set of image capturing devices. In some cases, the (sets of) image capturing devices 1010a and 1010b are positioned to face each other (e.g., to capture images of both sides of an object). In some cases, the optical inspection systems described herein can have one or more pairs of image capturing devices 1010a and 1010b, with the devices in each pair positioned to face each other. One or more motion sensors may be in communication with the first and second image capturing devices 1010a and 1010b, for example, to trigger the devices to capture (acquire) images of an object when it is detected by the motion sensor. Real-time images may be captured by the first and second image capturing devices as fast-moving objects move in front of each of the first and second image capturing devices. Other image capturing devices and/or motion sensors may also be included in the optical inspection systems described herein. Different configurations of image capturing devices are possible, such as from 2 to 10 pairs, or 3 pairs, or 6 pairs of cameras (e.g., with each pair configured to take images of both the front and the back of an object), or cameras positioned on only one side.

In FIGS. 1-3, storage systems 1020, 2022a-b, 2024, 2026, and/or 3024 may include a dynamic random access memory (DRAM) system for block cache, a persistent memory system (such as 3D XPoint), and/or a quad-layer cell or triple-layer cell solid state drive (SSD) system for storing data (e.g., raw format data, images, and/or pre-processed images from the cameras). The storage systems 1020, 2022a-b, 2024, 2026, 3022a-b, and/or 3024 may be configured for high write throughput and longevity (with frequent writes). The storage systems 1020, 2022*a-b*, 2024, 2026, 3022*a-b*, and/or 3024 can store all data from the cameras, or can store data selectively (e.g., only data that has been pre-processed, only data corresponding to defective objects, etc.). The storage systems 1020, 2022*a-b*, 2024, 2026, 3022*a-b*, and/or 3024 can store raw data, size-reduced data, and/or compressed data. The stored data can be hot data (i.e., data that is acquired and analyzed in real-time or near real-time), cold data (i.e., data that is stored and accessed at a later time that is not in real-time or near real-time, and/or data that is selected from the raw format data that can be used for future audits). In some cases, the systems and methods described herein can utilize tiered storage (e.g., with hot and cold data). For example, the acquired and pre-processed (e.g., resized) data can be stored in a persistent memory (e.g., with adequate longevity and write throughput) for use in the second-stage. Then, the output of the second-stage can be compressed and stored in a cold storage system (e.g., a quad layer SSD), which provides the required performance at a reasonable cost. In some cases, a DRAM storage tier can be utilized prior to storing the data in persistent memory or SSD for systems using in-memory processing.

In FIGS. 1-3, processor 1030, 2030, 2032*a-b*, 2034*a-b*, 3030, 3032*a-b*, and/or 3034*a-b* may be configured to enable two operating modes: Data Collection Mode, where all images are captured to the persistent memory system and the SSD system; and Production Mode where only some images (e.g., selected images with critical defective objects) are captured. Other operating modes are also possible, such as a mode where a sub-set of images are captured to the persistent memory system and the SSD system. Processor 1030, 2030, 2032*a-b*, 2034*a-b*, 3030, 3032*a-b*, and/or 3034*a-b* also may also be configured to receive the captured images from one or more image capturing devices (e.g., from one or multiple sets of the first and the second image capturing devices), and/or pre-process the images, and/or analyze the images, and/or generate reports based on the images.

In FIGS. 1-3, processor 1030, 2030, 2032*a-b*, 2034*a-b*, 3030, 3032*a-b*, and/or 3034*a-b* may be configured to process (or pre-process) the received captured images. For example, for each captured image, processor 1030, 2032*a-b*, 2034*a-b*, 3032*a-b*, and/or 3034*a-b* may perform image pre-processing such as resizing (or size-reducing) of images, and/or image processing such as feature extraction, to identify at least one fast-moving object in the captured image. The processor may also pre-process a captured image to select (or crop) at least a portion of the captured image (called a "sub-image") that contains an image of one or more objects (e.g., fast-moving objects).

In FIGS. 1-3, the processor 1030, 2030, 2032*a-b*, 2034*a-b*, 3030, 3032*a-b*, and/or 3034*a-b* may be configured to perform a grouping of the sub-images identified by the processor in such a way that each group of images includes the same fast-moving object. For example, a first group of sub-images can include a first image from the first image capturing device of a first fast-moving object from a first perspective view, and a second image from the second image capturing device of the same first fast-moving object from a second perspective view (where the first perspective view is at least partially or wholly different from the second perspective view). In some cases, the grouping of the identified sub-images can be performed based on, among other things: a timestamp comparison of each identified sub-image; an exterior shape and/or size of each identified fast-moving object in the identified sub-image; orientation of the identified fast-moving object in the identified sub-image; location of the identified fast-moving object in the identified sub-image; location of other objects and/or features (other than the identified fast-moving object) in the identified sub-image; and/or a surface texture/roughness, color, size, shape, and/or other features on or pertaining to the identified fast-moving object in the identified sub-image.

In some cases, for each identified sub-image in each group of sub-images: the processor can be configured to further identify any defects on the identified fast-moving object in the identified sub-image; and/or generate a defect score for each identified fast-moving object in the identified sub-image. In some cases, for each group of sub-images, which represents the same fast-moving object, the processor can be configured to generate a final defect score. In some cases, for each identified fast-moving object, the processor can be configured to perform a defect final classification and/or categorization of the fast-moving object based on one or more threshold scores. For example, in some cases, each object in an image is detected (or classified) as belonging to a particular type (or class) with a confidence score that is a measure of the confidence of the classification of the object. In some cases, only the classified type with the highest confidence score is selected. In cases where two or more cameras are used to image an object from two or more angles, the types (or classes) of the object from the images from the different camera angles are compared, and the worst grade (or class) wins. In another example, an identified fast-moving object can be classified as a major defective fast-moving object when a final defect score exceeds a first threshold score. Similarly, the identified fast-moving object can be classified as a minor defective fast-moving object when the final defect score does not exceed a first threshold score but exceeds a second threshold score. Additional, or other, classifications of the fast-moving object may be performed by including, for example, additional detection (or classification) processes.

In some cases, one or more of the above processes may be performed, in part or in whole, via artificial intelligence (AI) engines, models, and/or systems, including active learning frameworks (e.g., where the system can interactively query an operator (or some other information source) to label new data points with desired outputs). In some cases, training of the AI engines/systems may include generating and/or applying real and synthetic (or simulated) training data. The generating of such synthetic (or simulated) training data may be based on or derived from a smaller set of real training data.

In some cases, the processor(s) of the optical inspection systems and methods described herein may be configured to perform one or more of the following processes before, during, and/or after the image processing, grouping, scoring, and/or classifying/categorizing. The processor may be configured to perform an analysis of the captured images, identified sub-images, and/or one or more sub-parts of the identified sub-images (e.g., the identified fast-moving objects, other objects in the identified sub-images, surroundings, shaded portion(s) on identified fast-moving objects, and/or illuminated portion(s) on identified fast-moving objects) to assess whether or not illumination conditions used during the capturing of the images need to be adjusted. The processor(s) may be configured to adjust illumination conditions based on the analysis, where the adjusting of the illumination conditions can include increasing intensity of one or more light sources, and/or changing a color, frequency, and/or wavelength of one or more light sources. The processor(s) may be configured to edit the captured images, identified sub-images, and/or one or more sub-parts of the identified sub-images. The editing can include adjusting brightness, contrast, hue, color, and/or sharpness of the images, for example, to assist in improving the image processing, grouping, and/or scoring, and/or classifying, and/or categorizing of the objects.

The above analysis of one or more sub-parts of the identified sub-images, adjusting of illumination conditions, and/or editing of captured images, identified sub-images, and/or sub-parts of identified sub-images may be performed, in part or in whole, via AI engines/systems, including active learning frameworks.

Figure 4:
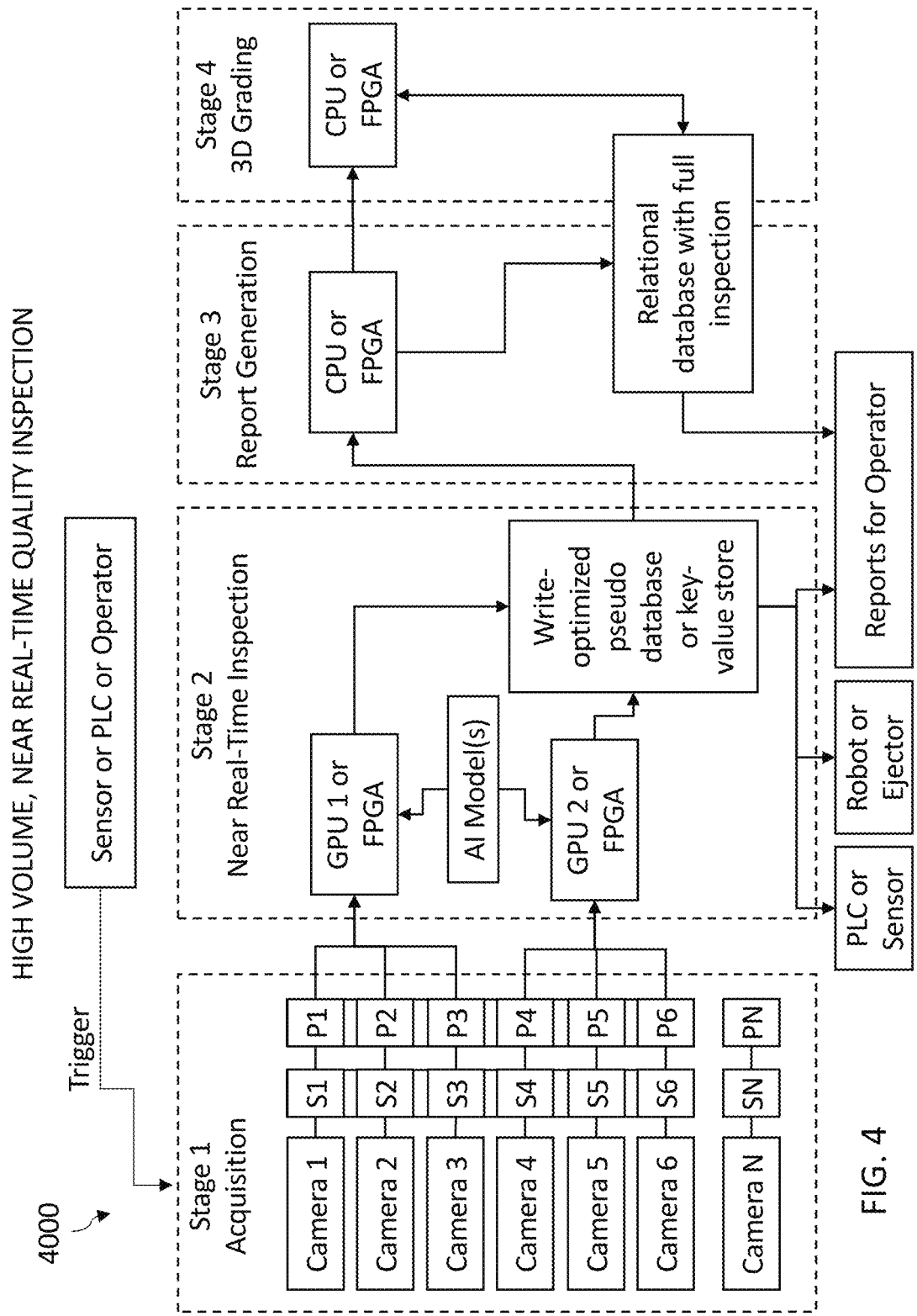
FIG. 4 shows an example of an optical inspection system, in accordance with some embodiments.

FIG. 4 shows an example of an optical inspection system 4000 that is similar to system 2000 in FIG. 2. The system in FIG. 4 includes 6 (or more) image capturing devices ("Camera 1"-"Camera N") that capture images in a first stage and send the captured images to two second-stage processors ("GPU#1 or FPGA" and "GPU#2 or FPGA"). Image capturing devices ("Camera 1"-"Camera N") can be any devices capable of capturing a digital image, including digital cameras, charge-coupled device (CCD) cameras, and digital video recording devices (i.e., digital video cameras). The cameras (i.e., image capturing devices ("Camera 1"-"Camera N")) are configured to capture images at fixed time intervals or based on a synchronization trigger (e.g., using external sensor(s), such as a motion sensor, a programmable logic controller (PLC), or a trigger from an operator). The images can be pre-processed (e.g., cropped and/or size-reduced) by first-stage processors ("P1"-"PN"). The first-stage processors can be stand-alone processors, cores of a third-stage processor that is a CPU, or FPGAs, as described with respect to the system in FIG. 2. In the example shown in FIG. 4, there is a processor coupled to each camera (1-N). In other embodiments, there can be fewer first-stage processors than cameras, and images from more than one camera can be pre-processed by a first-stage processor. For example, images from 1, or 2, or 3, or 4, or 5, or 6 cameras can be pre-processed by a first stage processor. For example, there can be 1, or 2, or 3, or 4, or 5, or 6, or 10, or 20, or from 1 to 20, or from 1 to 10 image capturing devices (e.g., "Camera 1"-"Camera N" in FIG. 4), and there can be 1, or 2, or 3, or 4, or 5, or 6, or 10, or 20, or from 1 to 20, or from 1 to 10 first-stage processors (e.g., "P1"-"PN" in FIG. 4). In some cases, the images are not compressed (or are maintained in an uncompressed state) by the first-stage processors to decrease the processing time required, which can help the system keep up with the speed of image acquisition (e.g., to achieve real-time, or near real-time operation).

In some cases of a first stage ("Stage 1 Acquisition") of optical inspection system 4000, the images are stored in a first-stage storage system or device ("S1"-"SN") (e.g., a high Endurance SSD or other type of persistent memory with low latency) after the images are acquired and before the images are sent to the two second-stage processors ("GPU#1 or FPGA" and "GPU#2 or FPGA"). In some cases, first-stage storage system or device ("S1"-"SN") is a single device coupled to all of the image capturing devices in the first stage, and to the second-stage processors. In other cases, "S1"-"SN" can be multiple first-stage storage systems or devices, wherein first-stage storage system or device ("S1"-"SN") is coupled to one or more image capture devices. For example, each of image capture devices ("Camera 1"-"Camera N") can be coupled to a separate first-stage storage system or device. In another example, three image capture devices ("Camera 1"-"Camera 3") can be coupled to a first first-stage storage system or device and to a first second-stage processor ("GPU #1 or FPGA"), and three image capture devices ("Camera 4"-"Camera 6") can be coupled to a second first-stage storage system or device and to a second second-stage processor ("GPU #2 or FPGA").

Images from a sub-set of the cameras (e.g., cameras #1-#3) can be sent to a first first-stage storage system or device (e.g., where "P1"-"P3" is one memory device), and another sub-set of the cameras (e.g., cameras #4-#6) can be sent to a second first-stage storage system or device (e.g., where "P4"-"P6" is one memory device). Six cameras are shown in this example, but in other examples, more or fewer cameras can be used. For example, "Camera N" could be coupled to either of the two second-stage processors (GPU#1 and #2, or FPGAs), or to another second-stage processor (not shown). In some cases, the two second-stage processors ("GPU#1 or FPGA" and "GPU#2 or FPGA") can be coupled to the first and the second first-stage storage systems or devices that are used to save the images from the cameras.

In a second stage ("Stage 2 Near Real-Time Inspection") of optical inspection system 4000, the two second-stage processors ("GPU#1 or FPGA" and "GPU#2 or FPGA") analyze the captured images using an AI model. Images from three cameras are being processed by each of the second-stage processors in optical inspection system 4000. In other cases, images from more or fewer than three (e.g., from 1 to 10) cameras can be processed by each second-stage processor. For example, the AI model can be used to detect objects in each image from each camera, and add (or apply, or draw, or determine the size and location of) bounding boxes to each object in each image. The AI model can then output an indication or a determination of the quality (or classification, or category) for each object in each image. For example, the AI model can be used to determine if an object is defective (i.e., is classified in a "bad" or "error" category) or non-defective (i.e., is classified in a "good" or "error-free" category). In some cases, only images with defective objects (or items) are compressed and saved to a second-stage storage system or device ("Write-optimized pseudo database or key-value store") (e.g., DRAM, SSD, or other persistent memory). The second-stage storage system ("Write-optimized pseudo database or key-value store") can be a write-optimized pseudo database (e.g., an embeddable key-value store). In some cases, the second-stage storage system or device ("Write-optimized pseudo database or key-value store") is configured to enable images to be saved very quickly, so that the saving images in the second stage can be done in real-time (or near real-time) (e.g., such that it is keeping up with the speed of image acquisition). Images with no defective objects (or, images with only objects classified in good categories) may not be saved to the second-stage storage system or device ("Write-optimized pseudo database or key-value store") to save time and space, in some cases. Images with error categories can be used by a customer (or operator) as a quality metric (or QA, or QC) or for further AI training (e.g., where the system employs active learning). The second-stage processors can also determine counts of acquired images (e.g., from all cameras, or from primary cameras only (e.g., only from cameras positioned on one side of the objects), and display the counts in a report in real-time or near real-time. Such counts can be used, for instance, for QA, QC, and other types of tracking and alerting (e.g., via email).

In the second stage of optical inspection system 4000, there may also be an optional ejector or a robot (e.g., a robotic arm) that ejects or removes defective objects (or objects classified as bad). For example, an ejector can include an air jet (or air stream) that is configured to eject defective objects (or items) out of a production (or sorting) line. The analysis and grading done in the second stage can be used to identify an object that is defective (as described above) and then a signal ("action trigger") can be sent to the ejector to eject the defective object from the production (or sorting) line in real-time. The robot can be a robotic arm (e.g., a mechanical arm) that is configured to remove defective objects (or items) out of a processing line. The systems and methods described herein, therefore enable the inspection of objects (e.g., fast-moving objects, objects in free-fall, or objects on a conveyor belt) and the ejection or removal of defective objects from the production (or sorting) line in real-time.

In a third stage ("Stage 3 Report Generation") of optical inspection system 4000, a third-stage processor ("CPU or FPGA" in the third stage in FIG. 4) (e.g., a CPU or FPGA) can further analyze the images and information (generated from the analysis in the second-stage) saved in the second-stage storage system ("Write-optimized pseudo database or key-value store"). For example, the third-stage processor ("CPU or FPGA") can read the bounding boxes of each object for all or a subset of the saved images, and save the information to a third stage storage system or device including a relational database. Reports with images and corresponding information (e.g., bounding boxes and/or categories) can then be generated (e.g., using an SQL interface) using the third-stage processor ("CPU or FPGA").

In a fourth stage ("Stage 4 3D Grading") of optical inspection system 4000, 3D grading and/or USDA grading can be done using a fourth-stage processor ("CPU or FPGA" in the fourth stage in FIG. 4) (e.g., a CPU or FPGA). The fourth-stage processor ("CPU or FPGA") (e.g., a CPU, one or more cores of a CPU, or an FPGA) can collect the data from all cameras (e.g., showing more than one side of an object) from the relational database (which can be used in both the third stage and the fourth stage) and then write back to the relational database. In some cases, the third- and fourth-stage processors are the same processor. In some cases, the cameras are paired and positioned to capture images of opposing sides of an object (or item), for example, objects that are in free-fall. Each pair of cameras can be mirror opposites, and one camera can be designated as a primary camera and the other camera in the pair can be designated as a secondary camera. Each of the images from the secondary cameras can be mirror reversed (i.e., where bounding boxes on the left would then appear on the right). After the mirror reversing, if a rightmost bounding box of an image from the secondary camera overlaps with a rightmost bounding box of an image from the primary camera, then that indicates that the objects in the bounding boxes are the opposite sides of the same object. In such cases, during the grading in the fourth stage, only one grade is assigned to that object (e.g., the most severe (or negative, or defective) grade or categorization is used). In the fourth stage, the size of the bounding boxes and/or objects within the bounding boxes can also be determined (e.g., based on a mapping from pixel size to actual size (e.g., millimeters)), and the size of each object can be determined. USDA grading can be done based on object weight. In some cases, an assumption is used where all objects within a batch have the same density, and therefore the size determined in the fourth stage can be used as a proxy to determine a USDA weight grading. In some cases, a USDA report can then be generated.

The reports generated in the second, third and fourth stages of optical inspection system 4000 can be read by an operator. In some cases, the operator can then improve the AI model by adding more training data based on the generated reports (e.g., in a system that uses active learning). For example, the operator can manually classify the object in the image and provide that information to the AI model to further train the AI model. In some cases, the generated reports are archived to the cloud (e.g., using Amazon Web Services, Microsoft Azure, or a private Data Center) and an automatic AI training will commence (e.g., using an autonomous machine learning framework), based on the revised classification by the operator. The newly trained AI model can then be deployed automatically. Such systems can advantageously allow an operator without data science expertise to train the AI.

Many of the components of system 4000 can be located either at the physical location of the objects being inspected or in the cloud (e.g., at a datacenter, or other physical location). Some components (e.g., image capturing devices ("Camera 1"-"Camera N"), trigger sensor, and ejector) are located at the physical location of the objects being inspected. For example, image capturing devices ("Camera 1"-"Camera N") can transmit captured images (e.g., using a high-speed data transfer method, such as 5G) to first-stage storage system or device ("S1"-"SN") located in the cloud (e.g., at a datacenter, or other physical location). In another example, first-stage processors ("P1"-"PN") can be located at the physical location of the objects being inspected, and they can transmit the pre-processed images (e.g., using a high-speed data transfer method, such as 5G) to second-stage processors ("GPU#1 or FPGA" and "GPU#2 or FPGA") located in the cloud. In some cases, captured images, pre-processed images, and/or other data (e.g., bounding box location, and/or grades) can be stored in storage systems (e.g., first-stage storage system or device ("S1"-"SN"), second-stage storage system or device ("Write-optimized pseudo database or key-value store") and/a third stage storage system or device including a relational database) located in the cloud. In some cases, the analysis, categorization and/or classification of the captured images (or an object in the captured images) can be performed by one or more processors (e.g., second-stage processors (GPU#1 and #2, or FPGAs), third-stage processor ("CPU or FPGA"), and/or fourth-stage processor ("CPU or FPGA")) located in the cloud. In another example, the second-stage processors and second-stage storage system are located in the cloud, and the third-stage processor and third-stage storage system are located at the location of the objects being inspected. In such cases, captured images, pre-processed images, and/or other data (e.g., bounding box location, and/or grades) can be sent to the cloud for processing and storage, and then data can be sent back to the location of the objects being inspected for further processing and storage.

Figure 5:
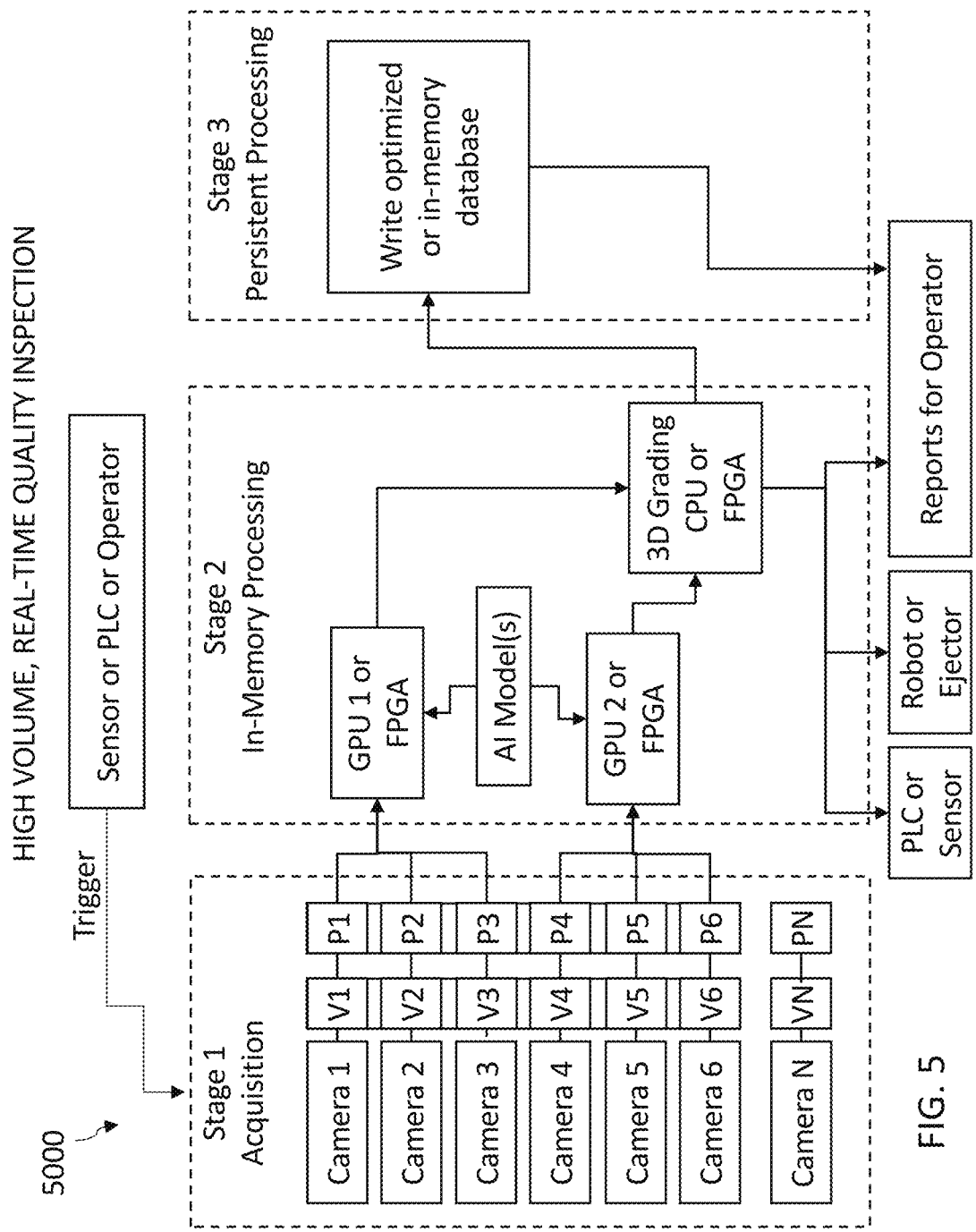
FIG. 5 shows an example of an optical inspection system, in accordance with some embodiments.

FIG. 5 shows an example of an optical inspection system 5000 that is similar to system 3000 in FIG. 3. The system in FIG. 5 includes 6 (or more) cameras that capture images in a first stage and send the captured images to two second-stage processors ("GPU#1 or FPGA" and GPU#2 or FPGA"). Image capturing devices ("Camera 1"-"Camera N") can be any devices capable of capturing a digital image, including digital cameras, charge-coupled device (CCD) cameras, and digital video recording devices (i.e., digital video cameras). The cameras are configured to capture images at fixed time intervals or based on a synchronization trigger (e.g., using external sensor(s)). The images can be size-reduced by first-stage processors ("P1"-"PN"). The first-stage processors can be stand-alone processors, cores of a third-stage processor that is a CPU, or FPGAs, as described with respect to the system in FIG. 3. In the example shown in FIG. 5, there is a processor coupled to each camera (1-N). In other embodiments, there can be fewer first-stage processors than cameras, and images from more than one camera can be pre-processed by a first-stage processor. For example, images from 1, or 2, or 3, or 4, or 5, or 6 cameras can be pre-processed by a first stage processor. For example, there can be 1, or 2, or 3, or 4, or 5, or 6, or 10, or 20, or from 1 to 20, or from 1 to 10 image capturing devices (e.g., "Camera 1"-"Camera N" in FIG. 4), and there can be 1, or 2, or 3, or 4, or 5, or 6, or 10, or 20, or from 1 to 20, or from 1 to 10 first-stage processors (e.g., "P1"-"PN" in FIG. 5). In some cases, the images are not compressed or are maintained in an uncompressed state to decrease the processing time required, which can help the system keep up with the speed of image acquisition.

In some cases of a first-stage ("Stage 1 Acquisition") of optical inspection system 5000, the images are stored in a volatile memory ("V1"-"VN") (e.g., DRAM or SRAM) after the images are acquired and before the images are sent to the two second-stage processors (GPU#1 or FPGA" and "GPU#2 or FPGA"). In some cases, volatile memory ("V1"-"VN") is a single volatile memory system or device coupled to all of the image capturing devices in the first stage, and all of the second-stage processors. In other cases, "V1"-"VN" can be multiple volatile memory systems or devices, wherein each volatile memory system or device is coupled to one or more image capture devices. For example, each of image capture devices ("Camera 1"-Camera N") can be coupled to a separate volatile memory system or device. In another example, three image capture devices ("Camera 1"-Camera 3") can be coupled to a first volatile memory system or device and to a first second-stage processor ("GPU #1 or FPGA"), and three image capture devices ("Camera 4"-Camera 6") can be coupled to a second volatile memory system or device and to a second second-stage processor ("GPU #2 or FPGA").

Images from a sub-set of the cameras (e.g., cameras #1-#3) can be sent to a first volatile memory system or device (e.g., where "V1"-V3" is one volatile memory device), and another sub-set of the cameras (e.g., cameras #4-#6) can be sent to a second volatile memory system or device (e.g., where "V4"-"V6" is one volatile memory device). The two second-stage processors ("GPU#1 or FPGA" and "GPU#2 or FPGA") can then be coupled to the first and a second volatile memory systems or devices that are used to save images from the cameras. Images from three cameras are being processed by each of the second-stage processors ("GPU#1 or FPGA" and "GPU#2 or FPGA") in optical inspection system 5000. In other cases, images from more or fewer than three (e.g., from 1 to 10) cameras can be processed by each second-stage processor. For example, "Camera N" could be coupled to either of the two second-stage processors ("GPU#1 or FPGA" and "GPU#2 or FPGA"), or to another second-stage processor (not shown).

In a second stage ("Stage 2 In-Memory Processing") of optical inspection system 5000, the two second-stage processors ("GPU#1 or FPGA" and "GPU#2 or FPGA") analyze the captured images using an AI model. For example, the AI model can be used to detect objects in each image from each camera, and add (or apply, or draw, or determine the size and location of) bounding boxes to each object in each image. The AI model can then output an indication or a determination of the quality (or classification, or category) for each object in each image. For example, the AI model can be used to determine whether an object is defective (i.e., is classified in a "bad" or "error" category) or non-defective (i.e., is classified in a "good" or "error-free" category). Images with error categories can be used by a customer (or operator) as a quality metric (or QA, or QC) or for further AI training (e.g., where the system employs active learning). The second-stage processors can also determine counts of acquired images (e.g., from all cameras, or from primary cameras only (e.g., positioned on one side of the objects)), and display the counts, e.g., in a report or on a display of a computing device, in real-time or near real-time. Such counts can be used, for instance, for QA, QC, and other types of tracking and email alerts.

In the second stage of optical inspection system 5000, 3D grading and/or USDA grading can also be done using an additional second-stage processor ("3D Grading CPU or FPGA") (e.g., a CPU or FPGA), that further analyzes the images and information (generated from the analysis) from the two second-stage processors ("GPU#1 or FPGA" and "GPU#2 or FPGA"). In some cases, the cameras are paired and positioned to capture images of opposing sides of an object (or item), for example, objects that are in free-fall. Each pair of cameras can be mirror opposites, and one camera can be designated as a primary camera and the other camera in the pair can be designated as a secondary camera. Each of the images from the secondary cameras can be mirror reversed (i.e., where bounding boxes on the left would then appear on the right). After the mirror reversing, if a rightmost bounding box of an image from the secondary camera overlaps with a rightmost bounding box of an image from the primary camera, that indicates that the objects in the bounding boxes are the opposite sides of the same object. In such cases, during the grading in the second stage, only one grade is assigned to that object (e.g., the most severe categorization is used). In the second stage, the size of the bounding boxes can also be determined (e.g., based on a mapping from pixel size to actual size (e.g., millimeters)), and the size of each object can be determined. USDA grading can be done based on object weight. In some cases, an assumption is used where all objects within a batch have the same density, and therefore the size determined in the second stage can be used as a proxy to determine USDA weight grading. In some cases, a USDA report can then be generated.

In the second-stage of optical inspection system 5000, there may also be an optional ejector or a robot (e.g., a robotic arm) that ejects or removes defective objects (or objects classified as bad). For example, an ejector can include an air jet (or air stream) that is configured to eject defective objects (or items) out of a production (or sorting) line. The analysis and grading done in the second stage can be used to identify an object that is defective (as described above) and then the additional second stage processor ("3D Grading CPU or FPGA") can send a signal ("action trigger") to the ejector to eject the defective object from the production (or sorting) line in real-time. The systems and methods described herein, therefore enable the inspection of objects (e.g., fast-moving objects, objects in free-fall, or objects on a conveyor belt) and the ejection or removal of defective objects from the production (or sorting) line in real-time. The robot can be or may comprise a robotic arm (e.g., a mechanical arm) that is configured to remove defective objects (or items) out of a processing line.

In some cases, one, some, or all of the operations performed in the second stage are low latency operations.

In a third stage ("Stage 3 Persistent Processing") of optical inspection system 5000, the images and/or information from the additional second-stage processor ("3D Grading CPU or FPGA") can be saved in a third-stage storage system or device ("Write optimized or in-memory database") (e.g., DRAM, SSD, or other persistent memory). For example, the images and/or information from the additional second-stage processor ("3D Grading CPU or FPGA") can be saved in a write optimized or in-memory database.

In some cases, after the images are processed using the AI model in the second stage, they are also saved in the second-stage. In some cases, the images are saved in the second stage without a tabular structure (e.g., without a structure that can be processed by SQL queries). In some cases, the data that is saved in the second stage does not have a tabular structure and cannot interface with a database (e.g., using Microsoft Excel, or a third party customer database) and/or cannot be converted into a report. In some cases, the processor in the third-stage takes the unstructured images and/or data (including, for example, the bounding boxes) from the second stage write optimized pseudo database and then stores the images, the metadata of the images, and/or related data in a tabular format, which can allow for data visualization, or for report generation, or for saving the images and/or data and/or metadata for end user operator consumption.

In some cases of optical inspection system 5000, only images with defective objects (or items) are saved to the third-stage storage system or device ("Write optimized or in-memory database"), which can be an in-memory storage system (e.g., SSD, or other type of persistent memory). In some cases, the second-stage and/or third-stage storage system or device ("Write optimized or in-memory database") is configured to enable images and/or metadata to be saved very quickly, so that the saving images in the second-stage and/or metadata in the third-stage can be done in real-time (or near real-time) (i.e., keeping up with the speed of image acquisition). Images with no defective objects (only objects classified in good categories) may not be saved to the second-stage and/or third-stage storage system or device ("Write optimized or in-memory database") to save time and space, in some cases. In some cases, the images are not compressed (or are maintained in an uncompressed state) to reduce the time required to acquire, process, analyze and save the images.

An output, such as a report, may also be generated in the second and/or third stage of optical inspection system 5000. The report can include a QC report, for example, that is displayed in a user interface or written to a plant database (e.g., SAP, Microsoft Access, or Printer). The report generated in the third stage can be read by an operator. In some cases, the operator can then improve the AI model by adding more training data based on the generated reports using active learning, as described herein.

Many of the components of system 5000 can be located at the physical location of the objects being inspected, or they can be located in the cloud (e.g., at a datacenter, or other physical location). Some components (e.g., image capturing devices ("Camera 1"-"Camera N"), trigger sensor, and ejector) are located at the physical location of the objects being inspected. For example, first-stage processors ("P1"-"PN") can be located at the physical location of the objects being inspected, and they can transmit the pre-processed images (e.g., using a high-speed data transfer method, such as 5G) to second-stage processors ("GPU#1 or FPGA" and "GPU#2 or FPGA") located in the cloud. In some cases, captured images, pre-processed images, and/or other data (e.g., bounding box location, and/or grades) can be stored in third-stage storage system or device ("Write optimized or in-memory database") located in the cloud. In some cases, the analysis, categorization and/or classification of the captured images (or an object in the captured images) can be performed by one or more processors (e.g., second-stage processors (GPU#1 and #2, or FPGAs) and/or additional second-stage processor ("3D Grading CPU or FPGA") located in the cloud. In another example, the second-stage processors are located in the cloud, and the third-stage storage system is located at the location of the objects being inspected. In such cases, captured images, pre-processed images, and/or other data (e.g., bounding box location, and/or grades) can be sent to the cloud for processing, and then data can be sent back to the location of the objects being inspected for storage.

In some cases, the first and second stages, or the first, second and third stages, or the first, second, third and fourth stages, of systems 4000 and/or 5000 can perform their respective functions on an image in real-time or near real-time, within a time period of less than about 18 ms, or less than about 19 ms, or less than about 20 ms, or less than about 30 ms. An object in free fall, for example, may pass by the systems described herein in about 18 ms to about 19 ms. Therefore, a real-time inspection, grading and/or ejection system and/or robotic system that operates in real-time, will be able to acquire image(s), analyze the image(s), output a determination of the quality of the object, save the images and/or information about the images, and/or report out the classifications and/or gradings, in less than about 18 ms to about 19 ms.

AI Model Training

In some cases, the AI models used in the systems and methods described herein are trained using synthetic data. In some cases, the synthetic data can be obtained by 1) collecting representative objects, 2) taking images of the representative objects from different angles, 3) masking and/or cropping each of the images, 4) creating a 3D model of the images using photogrammetry, and 5) creating a set of training data images from the 3D model.

In some cases, from 10 to 500, from 20 to 100, or from 50 to 60 representative objects are collected, from which the synthetic data is generated. The representative objects can include multiple (e.g., about 10, or about 20, or from 10 to 30, or from 10 to 50, or from 10 to 100) objects from each of the different classifications (or classes, or categories, or grades) that the system will use. Some examples of classifications (or classes, or categories, or grades) are related to quality (e.g., defective, non-defective), category (e.g., type-A, type-B), size (e.g., small, large), shape (e.g., round, square), and color (e.g., white, black, uniform, non-uniform).

The images from different angles can be taken using a digital camera, and in some cases, using the same camera(s) that will be used on the actual optical inspection systems described herein. In some cases, the images are taken from about 20 (or about 10, or about 50, or from about 10 to about 100) different angles that encompass 360-degrees around an axis of the object. In some cases, a first set of images are taken from about 20 (or about 10, or about 50, or from about 10 to about 50) different angles that encompass 360-degrees around a first axis of the object, and a second set of images are taken from about 20 (or about 10, or about 50, or from about 10 to about 50) different angles that encompass 360-degrees around a second axis of the object. The first axis can be perpendicular to the second axis, or the first axis and the second axis can have an angle between them, such as an angle of 45 degrees or an angle between 0 degrees and 90 degrees. In some cases, a first set of images are taken from about 20 (or about 10, or about 50, or from about 10 to about 50) different angles in a first loop that surrounds the object (i.e., where the camera is approximately level with the object), and a second set of images are taken from about 20 (or about 10, or about 50, or from about 10 to about 50) different angles in a second loop that is located above the object (i.e., where the camera is above the object and oriented to capture images of the object from different angles from above).

In some cases, the same background and lighting conditions as will be used in the actual optical inspection system are used to generate the images for the training data. For example, if the color (or wavelength) of light is cool white during the actual data collection and AI model inference by the optical inspection system, then it is desired to use the same cool white LED light during the synthetic data creation. In some cases, more than one light, or multiple lights, are used to simulate the actual lighting conditions (e.g., reflected light, multiple lights illuminating an object) used for one side or both sides of an object.

In some cases, the images are then masked and/or cropped to remove some or all of the background. For example, an image editing program (e.g., Adobe photoshop) can be used to mask and/or crop the images. In some cases, a portion (or all) of the background is removed and the object under question in the image is kept. The masking and/or cropping can improve the quality of the 3D model that will be created in the next step.

In some cases, a 3D model of each object is then created from the images of the object from different angles using photogrammetry (e.g., using Agisoft Metashape software). Photogrammetry is a tool by which one can create a virtual 3D model from a series of images taken at different angles.

Once the 3D models are created, then the synthetic images for the training data can be created from the 3D models (e.g., using 3D software, using 3D software developed for video games, and/or using Blender software). For example, a 3D model of an object can be used to create about 100, about 500, or from about 50 to about 1000, synthetic images from each of the 3D models. The synthetic images can be images of the object from many different angles, as might be seen in images taken by the actual optical inspection system during operation.

Figure 6A:
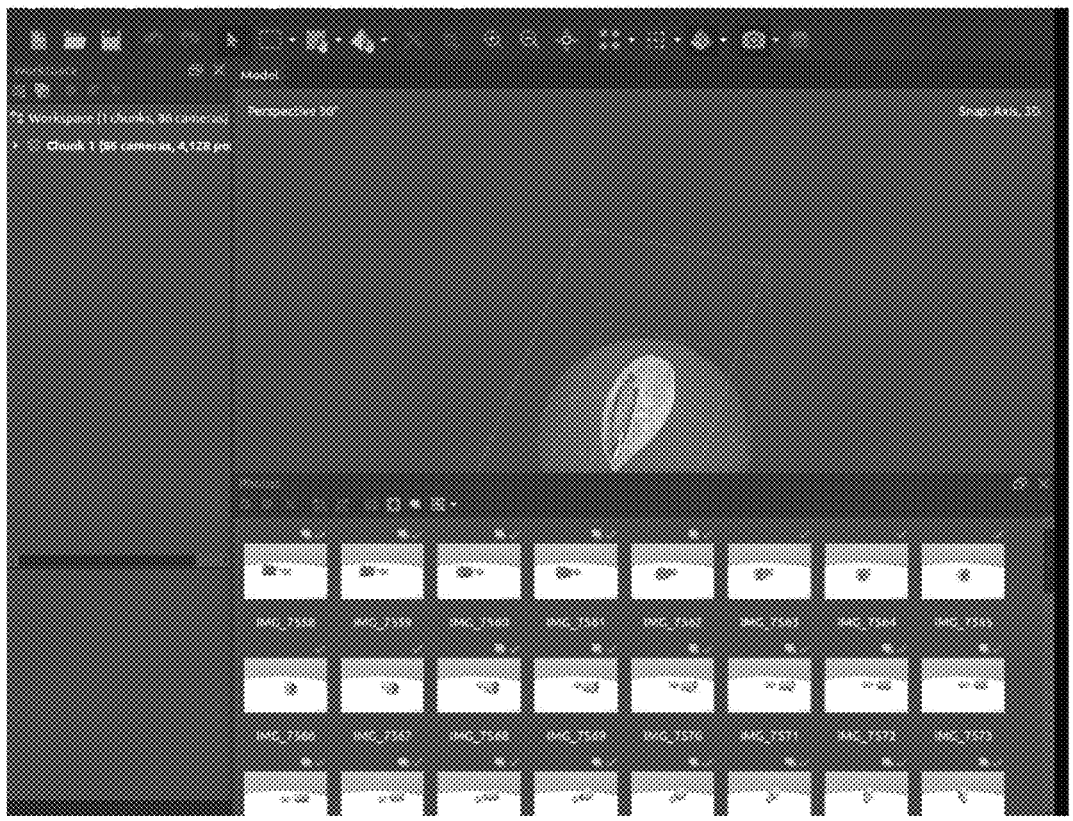
FIG. 6A shows an example of a 3D model of an object (an almond in this example) that was created using photogrammetry from images taken from many different angles, in accordance with some embodiments.
Figure 6B:
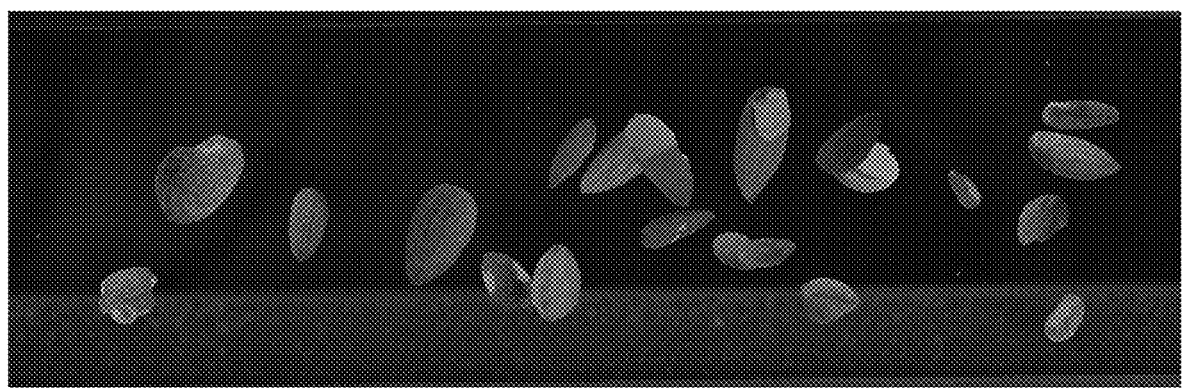
FIG. 6B shows synthetic images of different objects (almonds in this example) from different angles, in accordance with some embodiments.

FIG. 6A shows an example of a 3D model of an object (an almond in this example) that was created using photogrammetry from images taken from many different angles. The 3D model was then used to create synthetic images of the object from different angles. FIG. 6B shows synthetic images of different objects (almonds in this example) from different angles that were generated using 3D gaming software (such as Blender or Unity from the 3D model generated using photogrammetry. Then, COCO tools can be used to create AI training data from the synthetic images (from the 3D gaming software). The created AI training data can include labels and bounding box information corresponding to the images that an AI training module can understand, which can save tens of days of person hours spent on annotation.

In some cases, the AI model used in the systems and methods described herein are trained using synthetic data (e.g., generated as described above). The AI model can be trained by 1) using synthetic data to train the AI model, 2) collecting actual data using an optical inspection system described herein (e.g., during actual operation) and manually classifying some additional output data, and 3) improving the AI model using the manually classified additional output data (i.e., using active learning).

Figure 7A:
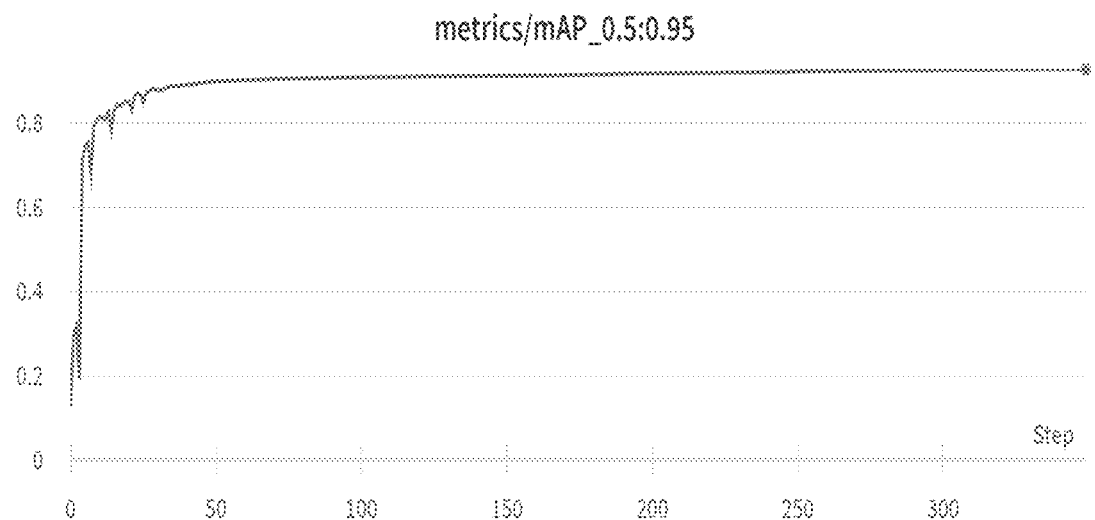
FIG. 7A shows an example of training an AI model for inspecting, analyzing, and/or grading objects (almonds in this example) with a chart that plots the mean average precision (mAP, on the y-axis) of the AI model over training iterations (or steps, on the x-axis), in accordance with some embodiments.

FIG. 7A shows an example of training data from an AI model for inspecting, analyzing, and/or grading objects (almonds in this example). FIG. 7A is a chart that plots the mean average precision (mAP, on the y-axis) of the AI model over training iterations (or steps, on the x-axis). The AI model achieves a 0.928 mAP score after about 300 to 350 iterations (or steps) (as shown in FIG. 7A). A higher mAP indicates that the AI model is able to detect the objects more accurately when taking an average across a set of analyzed objects. For example, an mAP@[0.5:0.95] indicates an average score precision of a set of analyzed objects with intersection over union (IoU) scores (IoU scores are described further below) between 0.5 and 0.95.

Once the AI model is trained using the synthetic data, the actual system can be used to generate an additional set of images for re-training and/or validating the AI model using active learning. The additional collected images can be manually classified (and/or annotated), and the manually classified additional images can be used to re-train the AI model and improve the accuracy (e.g., to greater than 90%, or to about 95% accuracy). In some cases, there may be from about 10,000 to about 100,000 (or about 50,000) total training images, and about 10% (or from about 5% to about 20%) of the training images are those that have been manually annotated for use in active learning, or to validate and/or to re-train the AI model.

Figure 7B:
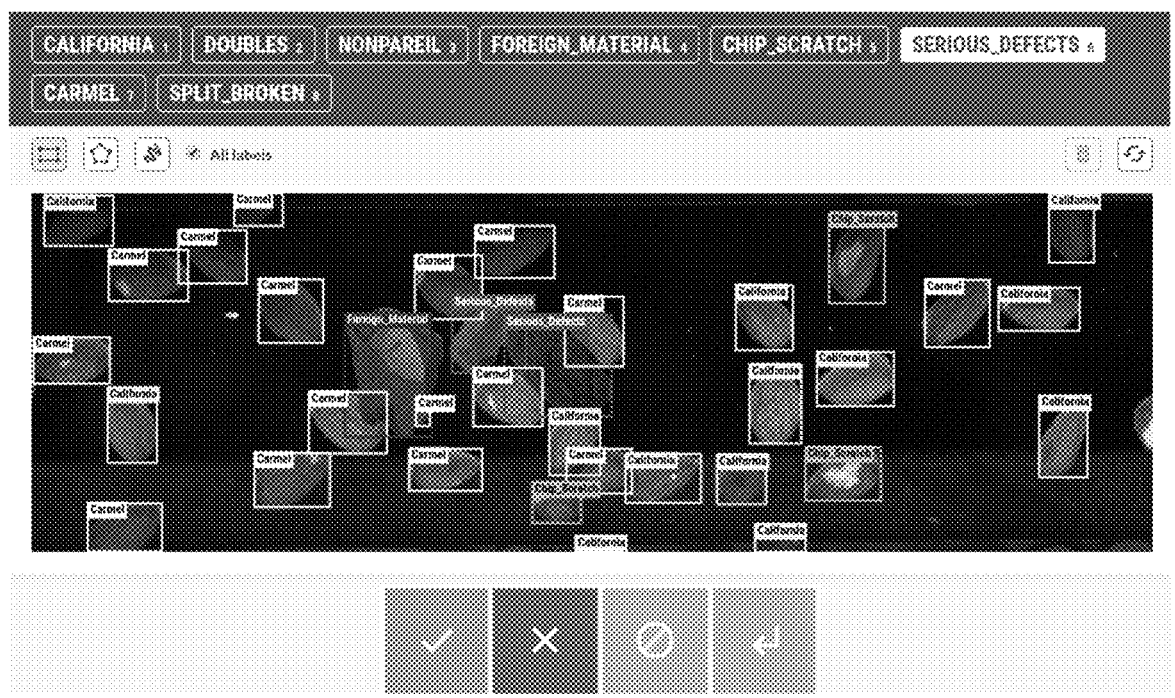
FIG. 7B shows an example of real images of objects (almonds in this example) taken by an optical inspection system, in accordance with some embodiments.

FIG. 7B shows an example of real images of objects (almonds in this example) taken by an actual optical inspection system, as described herein. Each of the images in FIG. 7B has been manually annotated by an operator to either validate or correct the output of the model trained using only synthetic data. An advantage of this approach is that the AI model trained using synthetic data can draw bounding boxes and labels (e.g., indicating the classification, grade, or type of an object). This eliminates the need for time-consuming manual bounding box drawing, and all that is required at this stage is to validate or correct erroneous labels (e.g., about 30% to 40% of the errors from the AI model trained using only synthetic data). This active learning process does rely on some manual annotation, however, since some of the processes have already been done (e.g., bounding box drawing and initial labeling), the total person hours required to train the AI model using the present methods leveraging synthetic data is significantly reduced compared to that of an entirely manual annotation process to generate a set of training images. Using synthetic data to train the AI models described herein can save a significant amount of time compared to manually determining a classification for every training image. For example, it may take 20-30 person days of annotation work to manually classify 20,000 to 50,000 training images, while generating classified training images using synthetic data (e.g., generated using the above method) can take significantly less resources (e.g., about 3 to about 10, or about 3 to about 5, or about 5, or about 10 person days).

The optical inspection systems described herein can analyze images using an AI model and produce reports containing classifications and/or grading information for objects in the images. In some cases, active learning (or incremental learning) is used to re-train the AI model, wherein information in a report is manually modified (e.g., by an operator), and the modified data is sent to the AI model to re-train the AI model. The information in the report can be manually modified, for example, to regroup the information, and/or to change one or more labels associated with images or objects. In some cases, such active learning methods are performed on systems with storage systems and/or processors that are in the cloud. For example, the modified information can be saved to a storage system in the cloud, and a processor in the cloud can be configured to re-train the AI model, and then the re-trained AI model can be provided to one or more processors of the optical inspection system to be used to analyze images.

Processing Images from a Pair of Opposing Cameras

Figure 8A:
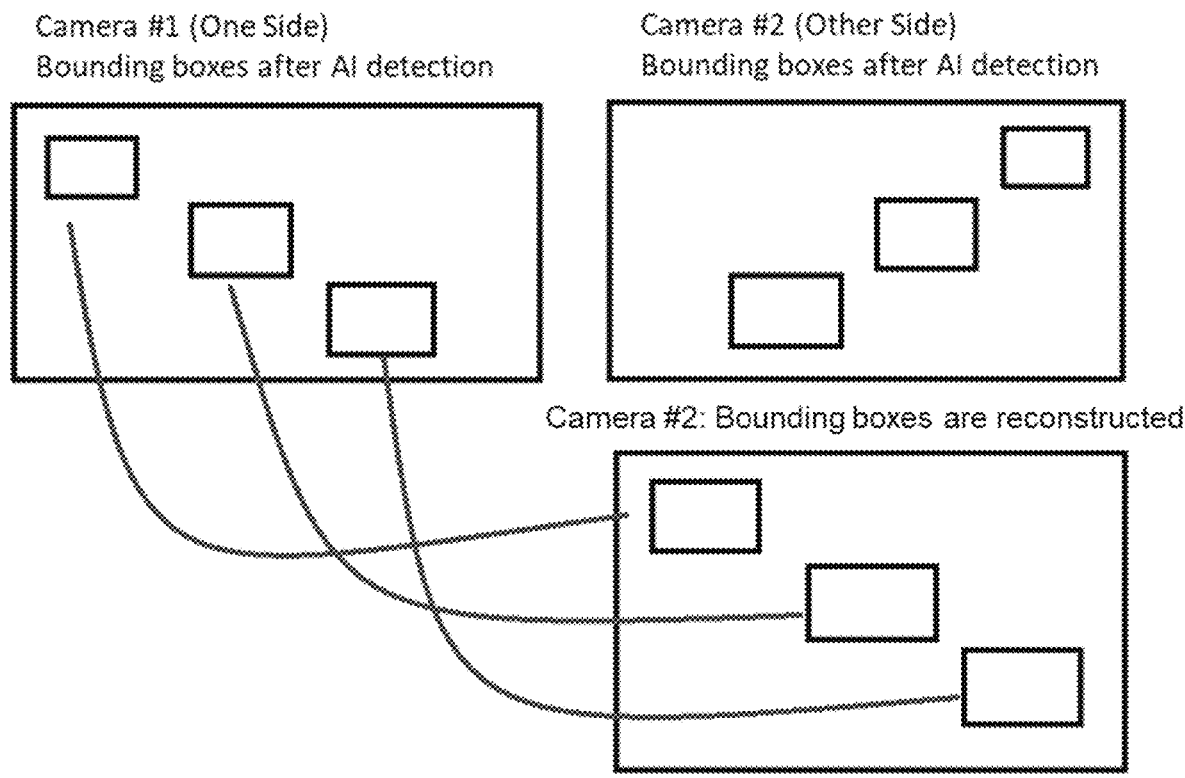
FIGS. 8A and 8B show an example of processing images from a pair of cameras, where one camera is positioned to take images of one side of an object and the other camera in the pair is positioned to take images of the other side of the object, in accordance with some embodiments.
Figure 8B:
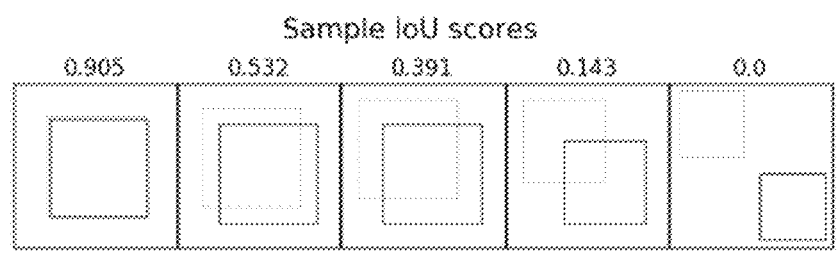

FIGS. 8A and 8B show an example of processing images from a pair of cameras, where one camera is positioned to take images of one side of an object and the other camera in the pair is positioned to take images of the other side of the object. This process can be used with the optical inspection systems and methods described herein, for example, as described with respect to the systems in FIGS. 1-5. FIG. 8A shows an image from a first camera ("Camera #1") (oriented to capture images from a first side of an object) with three objects identified and surrounded with bounding boxes. Also shown is an image from a second camera ("Camera #2") (oriented to capture images from a second side opposite to the first side of the object) with three objects identified and surrounded with bounding boxes. In an example, one side of a detected object has a good class or grade, but the other side is defective. Therefore, an image of the front of the object (from the first camera) and an image of the back of the object (from the second camera) can be associated together, and if either one of the sides is defective then the object can be graded as defective. To associate the detected object in two different images together, a mirror image of the bounding boxes in the image from the second side can be taken, as shown in FIG. 8A ("Camera #2: Bounding boxes are reconstructed").

FIG. 8A shows an example where the image taken from the second camera are mirrored (i.e., reflected horizontally). After the bounding boxes in the image from the second camera are mirror reversed (as shown in FIG. 8A) then the image from the first camera and the mirror image of the image from the second camera can be superimposed, and an algorithm (e.g., a Hungarian algorithm, also known as Kuhn-Munkres algorithm) can be applied to pair (or associate) bounding boxes in both the first and the second (or the primary and the secondary) camera images. The algorithm can determine which pairs of images represent two sides of the same object. Once the images are paired (or associated), then a final grading can be assigned to each object.

FIG. 8B shows some examples of how the bounding boxes of objects may overlap once the mirror image is taken of the image from the second camera and is superimposed with the image from the first camera. The algorithm can determine an intersection over union (IoU) value. High IoU values (e.g., those greater than 0, or greater than 0.5) indicate that a bounding box has a high degree of overlap with another bounding box, which indicates a high likelihood that the bounding boxes are surrounding the same object. Low IoU values (e.g., those less than 0.5, or about 0) indicate that that a bounding box has a low degree of overlap with another bounding box, which indicates a low likelihood that the bounding boxes are surrounding the same object. Advantages of this IoU-based approach is that no image processing is required and a relatively simple algorithm for determining an IoU can yield accurate results. Similar IoU methods have been used for objects detected by autonomous vehicles, however, unlike situations encountered by a self-driving car where the bounding boxes are of the same object in different timestamps, in the case of the optical inspection systems with opposing cameras described herein, the objects in each bounding box pair can have different appearances since the images being analyzed are taken from opposite sides of the same object. Therefore, the IoU method is uniquely well-suited to the present systems and methods, since other approaches that use advanced image processing of the bounding box areas to compare the similarities may be less reliable at detecting different sides of the same object.

Cloud Storage

In some cases, previously generated reports and/or data from one or more of the systems described herein are archived automatically to a storage system in the cloud. For example, all reports and data (e.g., images, bounding box location, and/or grades) from systems of a single customer (or operator, or owner) can be centrally stored in a cloud storage (e.g., a cloud storage system from Microsoft, or Amazon Web Services). In some cases, an operator can access the reports and/or data in the cloud, and obtain relevant quality grading or inspection metrics. Using such systems and methods, an operator can be provided with information that is useful for them (e.g., for QC) without having any data science skills or other software (e.g., Jupyter) knowledge. In some cases, an operator can use their domain knowledge to review and (quickly and easily) add, remove, and/or edit the grades in reports and/or data in the cloud. In some cases, updated reports and/or data used for active learning (e.g., including revised grade and/or other label information added, removed or edited by the operator) can be automatically stored in a centralized cloud database. The new information may then trigger a new AI model training for one or more of the systems of the customer (or operator, or owner). Archived data in the cloud can also be used to show historical trends over time (e.g., hours, days, months, or years). In some cases, aggregate reports can be created from the reports and/or data in the cloud, for example, that combine data from multiple optical inspection systems (and/or lines, and/or facilities), or that contain data that has been filtered (e.g., by system, location, etc.).

Optical Inspection Methods

Systems and methods for optical inspection systems for moving objects are described throughout the present disclosure. The optical inspection systems described herein (e.g., the systems shown in FIGS. 1-5) can be used to perform methods for optical inspection of moving objects.

In some embodiments, a method for optical inspection of moving objects includes the following steps. For example, the following method can be performed using the systems described in FIGS. 1, 2 and/or 4. A first image capturing device can acquire images of an object that is moving. A first first-stage storage system coupled to the first image capturing device can store images from the first image capturing device. A first second-stage processor coupled to the first first-stage storage system can analyze the images from the first image capturing device. A second image capturing device can acquire images from the object that is moving. A second first-stage storage system coupled to the second image capturing device can store images from the second image capturing device. A second second-stage processor coupled to the second first-stage storage system can analyze the images from the second image capturing device. A second-stage storage system coupled to the first and second second-stage processor can store images and/or information from the first and second second-stage processors. A third-stage processor coupled to the second-stage storage system can process information from the second-stage processor and second-stage storage system and produce a report. A third-stage storage system coupled to the third-stage processor can store images and information from the third-stage processor.

In some embodiments, a method for optical inspection of moving objects includes the following steps. For example, the following method can be performed using the systems described in FIGS. 1, 3 and/or 5. A first image capturing device can acquire images of an object that is moving. A first volatile memory system coupled to the first image capturing device can store images from the first image capturing device. A first second-stage processor coupled to the first volatile memory system can analyze the images from the first image capturing device. A second image capturing device can acquire images from the object that is moving. A second volatile memory system coupled to the second image capturing device can store images from the second image capturing device. A second second-stage processor coupled to the second volatile memory system can analyze the images from the second image capturing device. A third second-stage processor coupled to the first and second second-stage processors can process information from the first and second second-stage processors. A third-stage storage system coupled to the third second-stage processor can store images and information from the third second-stage processor. The third second-stage processor can produce a report using the images and information stored in the third-stage storage system.

The embodiments and components of the optical inspection systems described herein (e.g., those related to the systems shown in FIGS. 1-5) can be used to perform one or more of the methods for optical inspection of moving objects described above.

Embodiments of the disclosed invention have been referenced in detail, and one or more examples of the disclosed invention have also been illustrated in the accompanying figures. Each of the embodiments and examples herein have been provided to explain the present technology, not as limitations of the present technology. Furthermore, while particular embodiments of the invention have been described in detail, it will be appreciated that alterations to, variations of, and equivalents to these embodiments may be readily conceived of by those skilled in the art, upon attaining an understanding of the foregoing. For instance, features illustrated or described with respect to one embodiment may be used with another embodiment to yield an additional embodiment. It is intended that the present subject matter covers all such modifications and variations within the scope of the appended claims and their equivalents. Those of ordinary skill in the art may practice these and other modifications and variations to the present invention without departing from the scope of the present invention, which is more particularly set forth in the appended claims. Furthermore, the foregoing description is by way of example only, and is not intended to limit the invention, as will be appreciated by those of ordinary skill in the art.

What is claimed is:

1. An optical inspection system, comprising:
   an image capturing device configured to acquire images of an object that is moving;
   a first-stage storage system coupled to the image capturing device and configured to store images from the image capturing device;
   a second-stage processor coupled to the first-stage storage system and configured to analyze the images from the image capturing device;
   a second-stage storage system coupled to the second-stage processor and configured to store images and information from the second-stage processor;
   a third-stage processor coupled to the second-stage storage system and configured to process information from the second-stage processor and second-stage storage system and produce a report; and
   a third-stage storage system coupled to the third-stage processor and configured to store images and information from the third-stage processor.

2. The optical inspection system of claim 1, wherein the image capturing device is a digital camera, charge-coupled device (CCD) camera, or digital video camera.

3. The optical inspection system of claim 1, wherein the first-stage storage system is a solid state drive (SSD) or other type of persistent memory with low latency.

4. The optical inspection system of claim 1, further comprising a first-stage processor coupled to the first-stage storage system, wherein the first-stage processor is configured to size-reduce the images from the image capturing device, and maintain the images from the image capturing device in an uncompressed state or not compress the images from the image capturing device.

5. The optical inspection system of claim 1, wherein the second-stage processor is a graphics processing unit (GPU) or a field-programmable gate array (FPGA).

6. The optical inspection system of claim 1, wherein the second-stage processor is configured to analyze the images from the image capturing device using an artificial intelligence model.

7. The optical inspection system of claim 6, wherein the second-stage processor is further configured to analyzes the images using the artificial intelligence model to add bounding boxes to the images and classify the images according to predetermined classes.

8. The optical inspection system of claim 6, wherein the artificial intelligence model is trained using synthetic data that was generated using photogrammetry.

9. The optical inspection system of claim 6, wherein information in the report is manually modified to produce a modified report, and the modified report is used to re-train the artificial intelligence model using active learning.

10. The optical inspection system of claim 1, wherein the second-stage storage system comprises a write optimized pseudo database, or an embeddable key-value store database.

11. The optical inspection system of claim 1, wherein the third-stage processor is a central processing unit (CPU) or a field-programmable gate array (FPGA).

12. The optical inspection system of claim 1, wherein the third-stage storage system comprises a DRAM system, an SSD system, or other type of persistent memory system.

13. The optical inspection system of claim 1, wherein the third-stage storage system comprises a relational database.

14. The optical inspection system of claim 1, wherein one or more of the first-stage storage system, the second-stage processor, second-stage storage system, third-stage processor, and the third-stage storage system are located in the cloud.

15. An optical inspection system, comprising:
   an image capturing device configured to acquire images of an object that is moving;
   a volatile memory system coupled to the image capturing device and configured to store images from the image capturing device;
   a first second-stage processor coupled to the volatile memory system and configured to analyze the images from the image capturing device;
   a second second-stage processor coupled to the first second-stage processor and configured to process information from the first second-stage processor; and
   a third-stage storage system coupled to the second second-stage processor and configured to store images and information from the second second-stage processor, wherein the second second-stage processor is configured to produce a report using the images and information stored in the third-stage storage system.

16. The optical inspection system of claim 15, wherein the image capturing device is a digital camera, charge-coupled device (CCD) camera, or digital video camera.

17. The optical inspection system of claim 15, further comprising a first-stage processor coupled to the volatile memory system, wherein the first-stage processor is configured to size-reduce the images from the image capturing device and not compress the images from the image capturing device.

18. The optical inspection system of claim 15, wherein the volatile memory system is a DRAM system or an SRAM system.

19. The optical inspection system of claim 15, wherein the second-stage processor is a graphics processing unit (GPU) or a field-programmable gate array (FPGA).

20. The optical inspection system of claim 15, wherein the second-stage processor is configured to analyze the images from the image capturing device using an artificial intelligence model.

21. The optical inspection system of claim 20, wherein the second-stage processor analyzes the images using the artificial intelligence model to add bounding boxes to the images and classify the images according to predetermined classes.

22. The optical inspection system of claim 20, wherein the artificial intelligence model is trained using synthetic data that was generated using photogrammetry.

23. The optical inspection system of claim 20, wherein information in the report is manually modified to produce a modified report, and the modified report is used to re-train the artificial intelligence model using active learning.

24. The optical inspection system of claim 15, wherein the second second-stage processor is a central processing unit (CPU) or a field-programmable gate array (FPGA).

25. The optical inspection system of claim 15, wherein the third-stage storage system comprises a DRAM system, an SSD system, or other type of persistent memory system.

26. The optical inspection system of claim 15, further comprising an ejector or a robotic arm coupled to the second second-stage processor and configured to eject or remove the object when the second second-stage processor indicates that the object is defective.

27. The optical inspection system of claim 15, wherein one or more of the first second-stage processor, the second second-stage processor, and the third-stage storage system are located in the cloud.

* * * * *